US009595002B2

(12) United States Patent
Leeman-Munk et al.

(10) Patent No.: US 9,595,002 B2
(45) Date of Patent: Mar. 14, 2017

(54) NORMALIZING ELECTRONIC COMMUNICATIONS USING A VECTOR HAVING A REPEATING SUBSTRING AS INPUT FOR A NEURAL NETWORK

(71) Applicant: SAS Institute Inc., Cary, NC (US)

(72) Inventors: Samuel Paul Leeman-Munk, Raleigh, NC (US); James Allen Cox, Cary, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 15/175,503

(22) Filed: Jun. 7, 2016

(65) Prior Publication Data
US 2016/0350646 A1 Dec. 1, 2016

Related U.S. Application Data

(63) Continuation-in-part of application No. 14/937,810, filed on Nov. 10, 2015.
(Continued)

(51) Int. Cl.
*G06N 3/04* (2006.01)
*H04W 4/00* (2009.01)

(52) U.S. Cl.
CPC ......... *G06N 3/0445* (2013.01); *G06N 3/0472* (2013.01); *H04W 4/008* (2013.01)

(58) Field of Classification Search
None
See application file for complete search history.

(56) References Cited

U.S. PATENT DOCUMENTS 5,680,627 A 10/1997 Anglea et al.
5,727,081 A 3/1998 Burges et al.
(Continued)

FOREIGN PATENT DOCUMENTS

EP 0622752 A2 11/1994

OTHER PUBLICATIONS

Graves et al. Bidirectional LSTM Networks for Improved Phoneme Classification and Recognition. ICANN 2005: Artificial Neural Networks: Formal Models and Their Applications—ICANN 2005 pp. 799-804. 2005.*
(Continued)

*Primary Examiner* — Stanley K Hill
*Assistant Examiner* — Robert H Bejcek, II
(74) *Attorney, Agent, or Firm* — Kilpatrick Townsend & Stockton LLP

(57) ABSTRACT

Electronic communications can be normalized using a neural network. For example, a noncanonical communication that includes multiple terms can be received. The noncanonical communication can be preprocessed by (I) generating a vector including multiple characters from a term of the multiple terms; and (II) repeating a substring of the term in the vector such that a last character of the substring is positioned in a last position in the vector. The vector can be transmitted to a neural network configured to receive the vector and generate multiple probabilities based on the vector. A normalized version of the noncanonical communication can be determined using one or more of the multiple probabilities generated by the neural network. Whether the normalized version of the noncanonical communication should be outputted can also be determined using at least one of the multiple probabilities generated by the neural network.

30 Claims, 14 Drawing Sheets

Related U.S. Application Data

(60) Provisional application No. 62/270,779, filed on Dec. 22, 2015, provisional application No. 62/168,073, filed on May 29, 2015.

(56) References Cited

U.S. PATENT DOCUMENTS

| | | |
|---|---|---|
| 5,845,285 A | 12/1998 | Klein |
| 6,728,695 B1 | 4/2004 | Pathria et al. |
| 7,788,087 B2 | 8/2010 | Corston-Oliver et al. |
| 8,756,183 B1 | 6/2014 | Daily et al. |
| 8,775,341 B1 | 7/2014 | Commons |
| 9,280,747 B1 | 3/2016 | Jin et al. |
| 2005/0026198 A1 | 2/2005 | Balac Sipes et al. |
| 2005/0226512 A1 | 10/2005 | Napper |
| 2010/0054539 A1 | 3/2010 | Challa |
| 2010/0234246 A1 | 9/2010 | Jung et al. |
| 2011/0208522 A1 | 8/2011 | Pereg et al. |
| 2012/0262461 A1 | 10/2012 | Fisher et al. |
| 2012/0296913 A1 | 11/2012 | Ash et al. |
| 2013/0212707 A1 | 8/2013 | Donahue et al. |
| 2014/0188459 A1 | 7/2014 | Fink et al. |
| 2014/0229158 A1 | 8/2014 | Zweig et al. |
| 2015/0312333 A1 | 10/2015 | Motarwar et al. |
| 2015/0339570 A1 | 11/2015 | Scheffler |
| 2016/0027437 A1 | 1/2016 | Hong |
| 2016/0098386 A1 | 4/2016 | Rangarajan Sridhar |
| 2016/0117441 A1 | 4/2016 | Bremel |
| 2016/0247061 A1 | 8/2016 | Trask et al. |
| 2016/0350644 A1 | 12/2016 | Devarajan et al. |
| 2016/0350650 A1 | 12/2016 | Leeman-Munk et al. |
| 2016/0350651 A1 | 12/2016 | Devarajan et al. |
| 2016/0350652 A1 | 12/2016 | Min et al. |
| 2016/0350664 A1 | 12/2016 | Devarajan et al. |

OTHER PUBLICATIONS

Kim et al., "Character-Aware Neural Language Models" School of Engineering and Applied Sciences, Harvard University, Association for the Advancement of Artificial Intelligence, www.aaai.org (2016), 9 pages.
Clay, "Weighted mean from a set of average and standard deviation pairs", http://math.stackexchange.com/questions/654138/weighted-mean-from-a-set-of-average-and-standard-deviation-pairs, (Jan. 28, 2014), 2 pages.
Glorot, et al., "Domain adaptation for large-scale sentiment classification: a deep learning approach", Proc. of the 28th Intl. Conf. on Machine Learning, (2011), pp. 513-520.
Moraes et al., "Document-level sentiment classification: An empirical comparison between SVM and ANN", Expert Systems with Applications, vol. 40 (2), (Feb. 1, 2013), pp. 621-633.
Zhang, "Sentiment analysis of Chinese documents: From sentence to document level", Journal of the American Society for Inform. Sci. and Tech, vol. 60, No. 12, (Dec. 2009), pp. 2474-2487.
Healey, C. https://www.csc.ncsu.edu/faculty/healey/tweet_viz/tweet_app/ Faculty webpage, verifed by the Internet Archive: Wayback Machine to have existed since at least before (2013) 5 pages.
Dos Santos, C. et al., "Deep convolutional neural networks for sentiment analysis of short texts, " Inti. Conf. on Computational Linguistics (COLING 2014) pp. 69-78.
Kohli, A. http://amitkohli.com/sentiment-analysis-on-my-girlfriends-text-messages/ blog post on (Sep. 11, 2015) 9 pages.
Siddarth Shankar, , R. "Visualization of the Sentiment of Tweets," Master's Thesis, North Carolina State University (2011) 69 pages.
Conway, "Chat Room Sentiment Analysis with Stanford CoreNLP and ELK" (2016) 8 pages.
Lewis, G., "Sentence Correction Using Recurrent Neural Networks" Department of Computer Science, Stanford University (2016) 7 pages.
Sakaguchi et al., "Robust Wrod Reocginition via semi-Character Recurrent Neural Networks" Center for Language and Speech Processing, Johns Hopkins University (2016) 5 pages.
Jockers, M., Blog posts from www.matthewjockers.net from dates between Jun. 5, 2014 and Mar. 24, 2015 61 pages.
Wang, X. et al., "Topic sentiment analysis in Twitter: a graph-based hashtag sentiment classification approach," Proc. of the 20th ACM Intl. Conf. on Information and Knowledge Management (2011) pp. 1031-1040.
Hennig, L. et al., "An ontology-based approach to text summarization" IEEENVIC/ACM Inti. Conf. on Web Intelligence and Intelligent Agent Technology (2008) 4 pages.
Response by user ttnphns to post "Euclidean distance score and similarity" at http://stats.stackexchange.com/questions/53068/euclidean-distance-score-and-similarity dated Mar. 23, 2013. (1 page).
Suominen, H. et al., "Twitter for health-building a social media search engine to better understand and curate laypersons' personal experiences" in Amy Neustein (ed.), Text Mining of Web-based Medical Content, De Gruyter, Berlin (2014) pp. 133-174.
Saif, H. et al, "Semantic patterns for sentiment analysis of Twitter" International Semantic Web Conference, Springer International Publishing (Oct. 2014) pp. 324-340.
Xiang, B. et al., "Improving Twitter sentiment analysis with topic-based mixture modeling and semi-supervised training" Proceedings of 52nd Annual Meeting of the Association for Computer Linguistics (Jun. 23-25, 2014) pp. 434-439.
An Introduction to R—Oct. 4, 2004—https://web.archive.org/web/20041023014142/http:/lcran.r-project.org/doc/manuals/R-intro.html (2016) 83 pages.
Aw et al. "Phrase-based Statistical Model for SMS Text Normalization" Proceedings of the COLING/ACL 2006 Main Conference Poster Sessions (Jul. 2006) pp. 33-40.
Non-Final Office Action of Mar. 11, 2016 for U.S. Appl. No. 14/937,810, 14 pages.
Non-Final Office Action of May 5, 2016 for U.S. Appl. No. 14/967,619, 49 pages.
Non-Final Office Action of Jun. 29, 2016 for U.S. Appl. No. 14/966,117, 18 pages.
Non-Final Office Action of Jul. 1, 2016 for U.S. Appl. No. 14/966,380, 16 pages.
Final Office Action of Sep. 19, 2016 for U.S. Appl. No. 14/937,810, 9 pages.
Notice of Allowance of Oct. 7, 2016 for U.S. Appl. No. 14/937,810, 5 pages.
Final Office Action of Nov. 30, 2016 for U.S. Appl. No. 14/967,619, 22 pages.
Non-Final Office Action of Dec. 16, 2016 for U.S. Appl. No. 15/177,237, 26 pages.
Non-Final Office Action of Dec. 19, 2016 for U.S. Appl. No. 14/966,380, 15 pages.
Bastien et al., "Theano: new features and speed improvements" arXiv:1211.5590v1 cs.SC (Nov. 23, 2012) 10 pages.
Bengio "Learning Deep Architectures for AI" Foundations and Trends in Machine Learning vol. 2, No. 1 (2009) pp. 1-127.
Bergstra et al., "Theano: A CPU and GPU Math Compiler in Python" Proc. of the 9th Python in Science Conf. (SCIPY 2010) 8 pages.
Collobert et al., "Natural Language Processing (almost) from Scratch" arXiv:1103.0398v1 cs.LG (Mar. 2, 2011) 47 pages.
Kalchbrenner et al., "A Convolutional Neural Network for Modelling Sentences" Department of Computer Science University of Oxford (2010) 11 pages.
Levenshtein V.I. "Binary Codes Capable of Correcting Deletions, Insertions, and Reversals" Soviet Physics—Doklady vol. 10. No. 8 (1966) 4 pages.
Rumelhart et al., "Learning representations by back-propagating errors" Nature vol. 323 (Oct. 9, 1986), 4 pages.
Srivastava et al., "Dropout: A Simple Way to Prevent Neural Networks from Overfilling" Journal of Machine Learning Research 15 (2014) 1929-1958.

(56) References Cited

OTHER PUBLICATIONS

Vincent et al., "Extracting and Composing Robust Features with Denoising Autoencoders" Dept. IRO, Universit'e de Montreal C.P. 6128, Montreal, Qc, H3C 3J7, Canada Technical Report 1316(Feb. 2008) 16 pages.
Yosinski et al., "How transferable are features in deep neural networks?" arXiv:1411.1792v1 cs.LG (Nov. 6, 2014)14 pages.
Zeiler et al.,"On Rectified Linear Units for Speech Processing" New York University, USA (2011) 5 pages.
Non-Final Office of Mar. 11, 2016 for U.S. Appl. No. 14/937,810; 15 pages.
Li et al., "Neural Network Approaches for Noisy Language Modeling" IEEE Transactions on Neural Networks and Learning Systems, vol. 24, No. 11 (Nov. 2013) 12 pages.
Hodge et al., "A Comparison of Standard Spell Checking Algorithms and a Novel Binary Neural Approach" IEEE Transactions on Knowledge and Data Engineering, vol. 15, No. 5, (Sep./Oct. 2003) 9 pages.
Collobert et al., "A Unified Architecture for Natural Language Processing: Deep Neural Networks with Multitask Learning" Proceedings of the 25th International Conference on Machine Learning, Helsinki, Finland, (2008) 8 pages.
Hodge et al., "A comparison of a novel neural spell checker and standard spell checking algorithms" Pattern Recognition 35 (2002) pp. 2571-2580.
Kukick, Karen "Techniques for Automatically Correcting Words in Text" ACM Computing Surveys, vol. 24, No. 4 (Dec. 1992) 63 pages.
Ghiassi et al., "Twitter brand sentiment analysis: A hybrid system using n-gram analysis and dynamic artificial neural network" Expert Systems with Applications 40 (2013) pp. 6266-6282.
Lewellen, Mark "Neural Network Recognition of Spelling Errors" Annual Meeting of the Association of Computational Linguistics (1998) 3 pages.
Chrupala, Grzegorz "Normalizing tweets with edit scripts and recurrent neural embeddings" Proceedings of the 52nd Annual Meeting of the Association for Computational Linguistics (Short Papers), pp. 680-686, Baltimore, Maryland, USA, Jun. 23-25, 2014.
Dahl et al., "Context-Dependent Pre-Trained Deep Neural Networks for Large-Vocabulary Speech Recognition" IEEE Transactions on Audio, Speech, and Language Processing, vol. 20, No. 1 (Jan. 2012) 13 pages.
Su et al., "Error Back Propagation for Sequence Training of Context-Dependent Deep Networks for Conversational Speech Transcription" ICASSP (2013) 5 pages.
Gupta et al., "Spell Checking Techniques in NLP: A Survey" International Journal of Advanced Research in Computer Science and Software Engineering vol. 2, Issue 12 (Dec. 2012) 5 pages.
Kim et al., Character-Aware Neural Language Models School of Engineering and Applied Sciences, Harvard University, Association for the Advancement of Artificial Intelligence, www.aaai.org (2016), 9 pages.
Non-Final Office Action of Jan. 3, 2017 for U.S. Appl. No. 14/966,117; 19 pages.

\* cited by examiner

| Input | @Ez_DoesssIt yeh but still that's wild lol |
|---|---|
| Gold | @ez_doesssit yeah but still that's wild laughing out loud |
| CLSTM by Sentence | @ez_doesssit yeh but still thae s n laughing out lou |
| CLSTM by Word | @ez_doesssit yeh but still that's wild aut lou |
| Skip-Bigram | @ez_doesssit yeah but still that's wild laughing out loud |
| DeepNorm | @ez_doesssit yeah but still that's wild laughing out loud |

FIG. 13

| Input | The lght In our wIndow above showed that thIs late vIsIt was Indeed Intended for us . |
|---|---|
| Gold | The light in our window above showed that this late visit was indeed intended for us . |
| CLSTM by Sentence | The light in our window above showed that this late visit was indeed intended for us . |
| CLSTM by Word | The light in our window above showed that this late visit was indeed intended for us . |
| Skip-Bigram | The light in our vIsit above showed that this late vIsit was indeed intended for us . |
| DeepNorm | The light in our window above showed that this late visit was indeed ingerded for us . |

FIG. 14

NORMALIZING ELECTRONIC COMMUNICATIONS USING A VECTOR HAVING A REPEATING SUBSTRING AS INPUT FOR A NEURAL NETWORK

REFERENCE TO RELATED APPLICATION

This claims priority under 35 U.S.C. §119(e) to U.S. Provisional Patent Application No. 62/270,779, titled "System for Deep Encoding and Reconstruction for Normalization of Noisy Text" and filed on Dec. 22, 2015, and under 35 U.S.C. §120 as a continuation-in-part of co-pending U.S. patent application Ser. No. 14/937,810, titled "Normalizing Electronic Communications Using Neural Networks" and filed Nov. 10, 2015, which claims the benefit of priority under 35 U.S.C. §119(e) to U.S. Provisional Patent Application No. 62/168,073, titled "Deep Encoding and Reconstruction for Normalization of Noisy Text" and filed May 29, 2015, the entirety of each of which is hereby incorporated by reference herein.

TECHNICAL FIELD

The present disclosure relates generally to normalizing electronic communications. More specifically, but not by way of limitation, this disclosure relates to normalizing electronic communications using a neural network.

BACKGROUND

With the rise of the Internet and mobile electronic devices, users are generating increasing amounts of electronic content. Electronic content often takes the form of forum posts, text messages, social networking posts, blog posts, e-mails, or other electronic communications. In many cases, electronic content can include shorthand words, slang, acronyms, misspelled words, incorrect grammar, and other informalities.

SUMMARY

In one example, a computer readable medium comprising program code executable by a processor is provided. The program code can cause the processor to receive an electronic representation of a noncanonical communication. The noncanonical communication can include multiple terms. The program code can cause the processor to preprocess the noncanonical communication by generating a vector comprising a plurality of characters from a term of the multiple terms. The vector can have a predetermined length greater than a length of the term. The program code can cause the processor to preprocess the noncanonical communication by repeating a substring of the term in the vector such that a last character of the substring is positioned in a last position in the vector. The last character of the substring can be the same as the last character in the term. The program code can cause the processor to transmit the vector to a neural network comprising at least two bidirectional gated recurrent neural network (BGRNN) layers. The neural network can be configured to receive the vector and generate multiple probabilities based on the vector. The program code can cause the processor to determine a normalized version of the noncanonical communication using one or more of the multiple probabilities generated by the neural network. The program code can cause the processor to determine that the normalized version of the noncanonical communication should be outputted or should not be outputted using at least one of the multiple probabilities generated by the neural network.

In another example, a method is provided that can include receiving an electronic representation of a noncanonical communication. The noncanonical communication can include multiple terms. The method can include preprocessing the noncanonical communication by generating a vector comprising a plurality of characters from a term of the multiple terms. The vector can have a predetermined length greater than a length of the term. The method can include preprocessing the noncanonical communication by repeating a substring of the term in the vector such that a last character of the substring is positioned in a last position in the vector. The last character of the substring can be the same as the last character in the term. The method can include transmitting the vector to a neural network comprising at least two bidirectional gated recurrent neural network (BGRNN) layers. The neural network can be configured to receive the vector and generate multiple probabilities based on the vector. The method can include determining a normalized version of the noncanonical communication using one or more of the multiple probabilities generated by the neural network. The method can include determining that the normalized version of the noncanonical communication should be outputted or should not be outputted using at least one of the multiple probabilities generated by the neural network.

In another example, a system is provided that can include a processing device and a memory device. The memory device can include instructions executable by the processing device for causing the processing device to receive an electronic representation of a noncanonical communication. The noncanonical communication can include multiple terms. The instructions can cause the processing device to preprocess the noncanonical communication by generating a vector comprising a plurality of characters from a term of the multiple terms. The vector can have a predetermined length greater than a length of the term. The instructions can cause the processing device to preprocess the noncanonical communication by repeating a substring of the term in the vector such that a last character of the substring is positioned in a last position in the vector. The last character of the substring can be the same as the last character in the term. The instructions can cause the processing device to transmit the vector to a neural network comprising at least two bidirectional gated recurrent neural network (BGRNN) layers. The neural network can be configured to receive the vector and generate multiple probabilities based on the vector. The instructions can cause the processing device to determine a normalized version of the noncanonical communication using one or more of the multiple probabilities generated by the neural network. The instructions can cause the processing device to determine that the normalized version of the noncanonical communication should be outputted or should not be outputted using at least one of the multiple probabilities generated by the neural network.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures:

FIG. 13 is a table of an example of results from different normalization methods according to some aspects.

FIG. 14 is a table of another example of results from different normalization methods according to some aspects.

Figure 1:
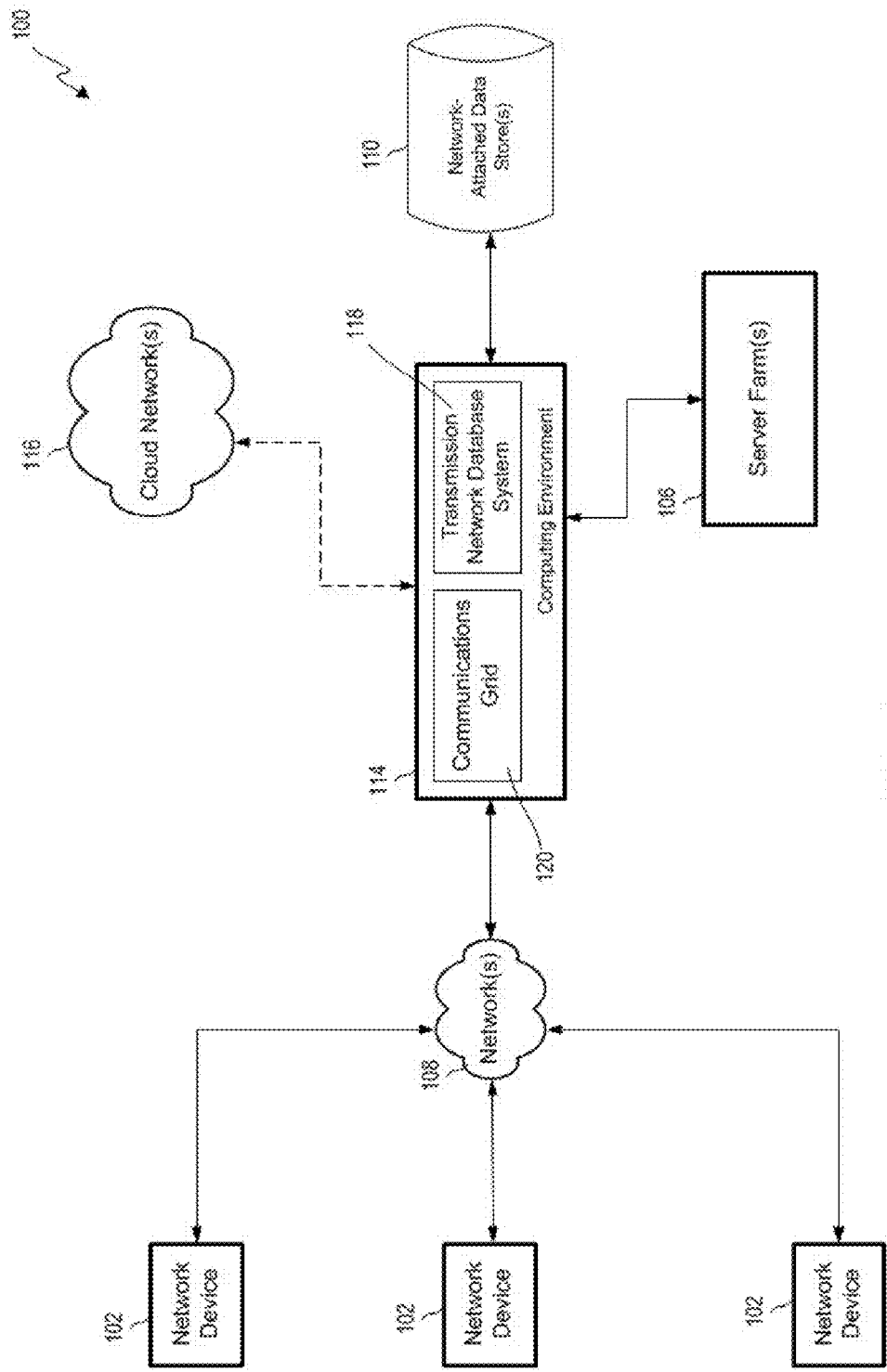
FIG. 1 is a block diagram of an example of the hardware components of a computing system according to some aspects.

In the appended figures, similar components or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of examples of the technology. But various examples can be practiced without these specific details. The figures and description are not intended to be restrictive.

The ensuing description provides examples only, and is not intended to limit the scope, applicability, or configuration of the disclosure. Rather, the ensuing description of the examples provide those skilled in the art with an enabling description for implementing an example. Various changes may be made in the function and arrangement of elements without departing from the spirit and scope of the technology as set forth in the appended claims.

Specific details are given in the following description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples can be described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but can have additional operations not included in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

Certain aspects and features of the present disclosure relate to normalizing electronic communications using a neural network. An electronic communication can include a communication from an electronic device, such as a computing device. In some examples, the electronic communication can include an image or a result of an automated process, such as an optical character recognition (OCR) process. The electronic communication can include one or more (textual) words that are in a noncanonical form. In some examples, a word can be in a noncanonical form if the word is misspelled according to an accepted and standardized spelling of the word or does not comport with one or more standardized grammatical rules. For example, "ur" can be a noncanonical form of the word "you're." As another example, "you're" can be a noncanonical version of the word "your," if the grammatical context calls for the word "your" rather than "you're." A word can additionally or alternatively be in a noncanonical form if the word includes a combination of two or more sub-words. For example, "yessir" can be a noncanonical form of the words "yes sir," "wassup" can be a noncanonical form of the words "what is up" or "what's up," and "lemmeknow" can be a noncanonical form of the words "let me know." In some examples, a word can be in a noncanonical form if the word is split into two or more words. For example, "l o v e" can be a noncanonical form of the word "love," and "ho pe" can be a noncanonical form of the word "hope." A word that is in a noncanonical form can be referred to as a noncanonical term, and an electronic communication containing a noncanonical term can be referred to as a noncanonical communication.

Noncanonical communications can result from technical issues (such as a failure in an OCR process), typographical errors, misspellings, or even deliberate alternative spellings for purposes of saving space or creative expression. The variety of causes and types of noncanonical communications can make it challenging to analyze and normalize noncanonical terms in an electronic communication, such as to perform textual analysis.

In some examples, a computing device can determine a normalized version of a noncanonical term using a neural network. The computing device can use the neural network to determine a canonical form of the noncanonical term. For example, the computing device can use the neural network to determine that a normalized version of the noncanonical term "u" is "you." Additionally, the computing device can use the neural network to analyze the noncanonical term and determine if the noncanonical term should be normalized. If the neural network determines that the noncanonical term should be normalized, the computing device can output the normalized version of the noncanonical term. If the neural network determines that the noncanonical term should not be normalized, the computing device can output the noncanonical term.

FIGS. 1-4 depict examples of systems usable for normalizing electronic communications using a neural network. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120.

Data transmission network 100 also includes one or more network devices 102. Network devices 102 may include client devices that can communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices can transmit electronic messages with noncanonical information, either all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data with noncanonical information to a network-attached data store 110 for storage. The computing environment 114 may later retrieve the data from the network-attached data store 110 and use the data for textual analysis.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data, such as data from a website (e.g., a forum post, a Twitter™ tweet, a Facebook™ post, a blog post, an online review), a text message, an e-mail, or any combination of these.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate time series data or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the sever farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time. As another example, website data may be analyzed to determine one or more trends in comments, posts, or other data provided by users.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for performing data analytics or textual analysis on data that includes noncanonical information.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for normalizing electronic communications using a neural network. For example, the computing environment 114, a network device 102, or both can implement one or more versions of the processes discussed with respect to FIGS. 5-17.

Figure 2:
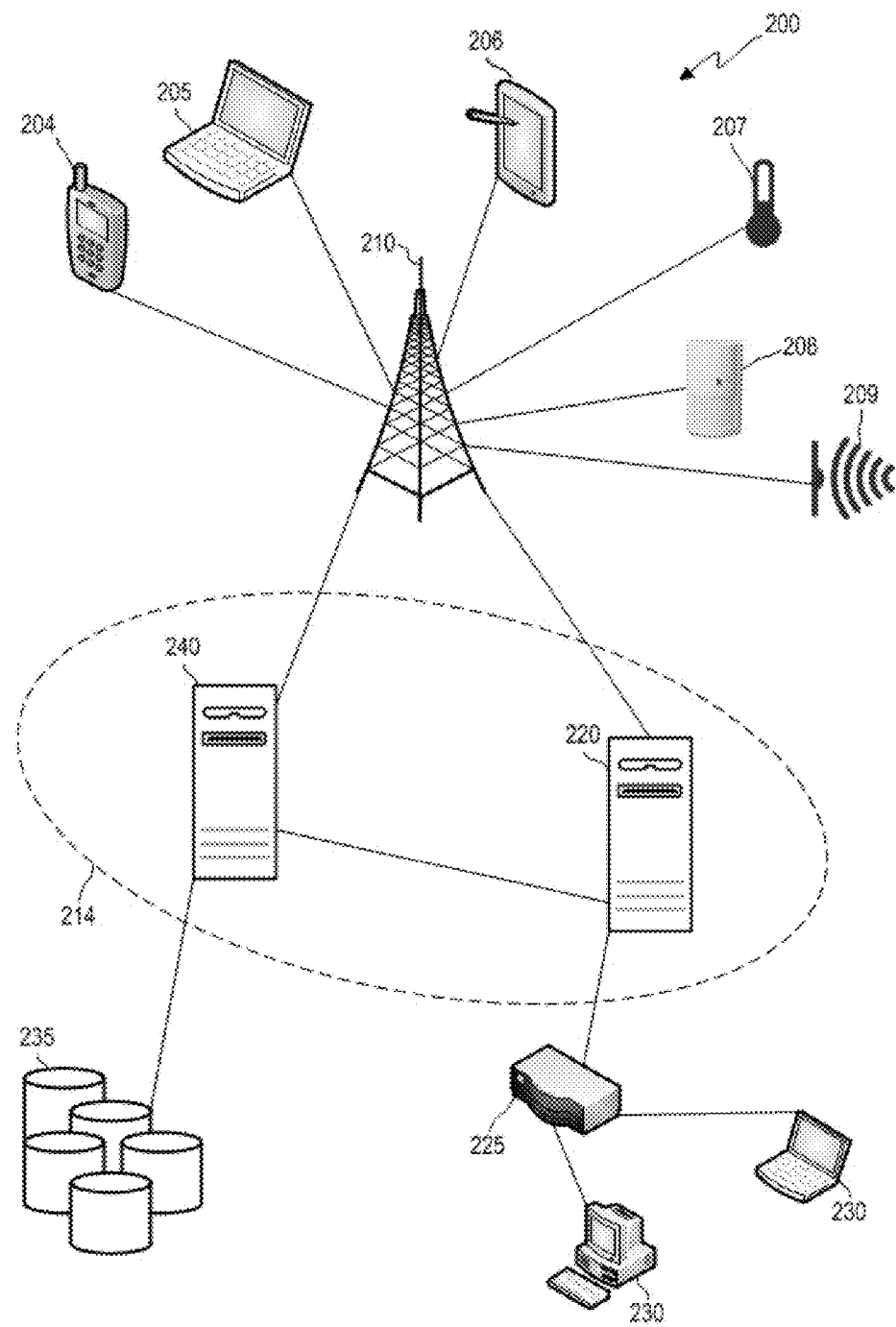
FIG. 2 is an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include noncanonical information. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can transform data that includes noncanonical information into a canonical format before transmitting the data to the computing environment 214 for further processing (e.g., which can include applying big data analytics or textual analysis to the data).

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a project in which textual analysis is performed on one or more electronic communications, the computing environment 214 can perform pre-analysis of the one or more electronic communications. The pre-analysis can include normalizing the electronic communications by converting one or more noncanonical terms in an electronic communication into a canonical version of the noncanonical term. The computing environment 214 can determine the canonical version of the noncanonical term at least in part by using a neural network.

Figure 3:
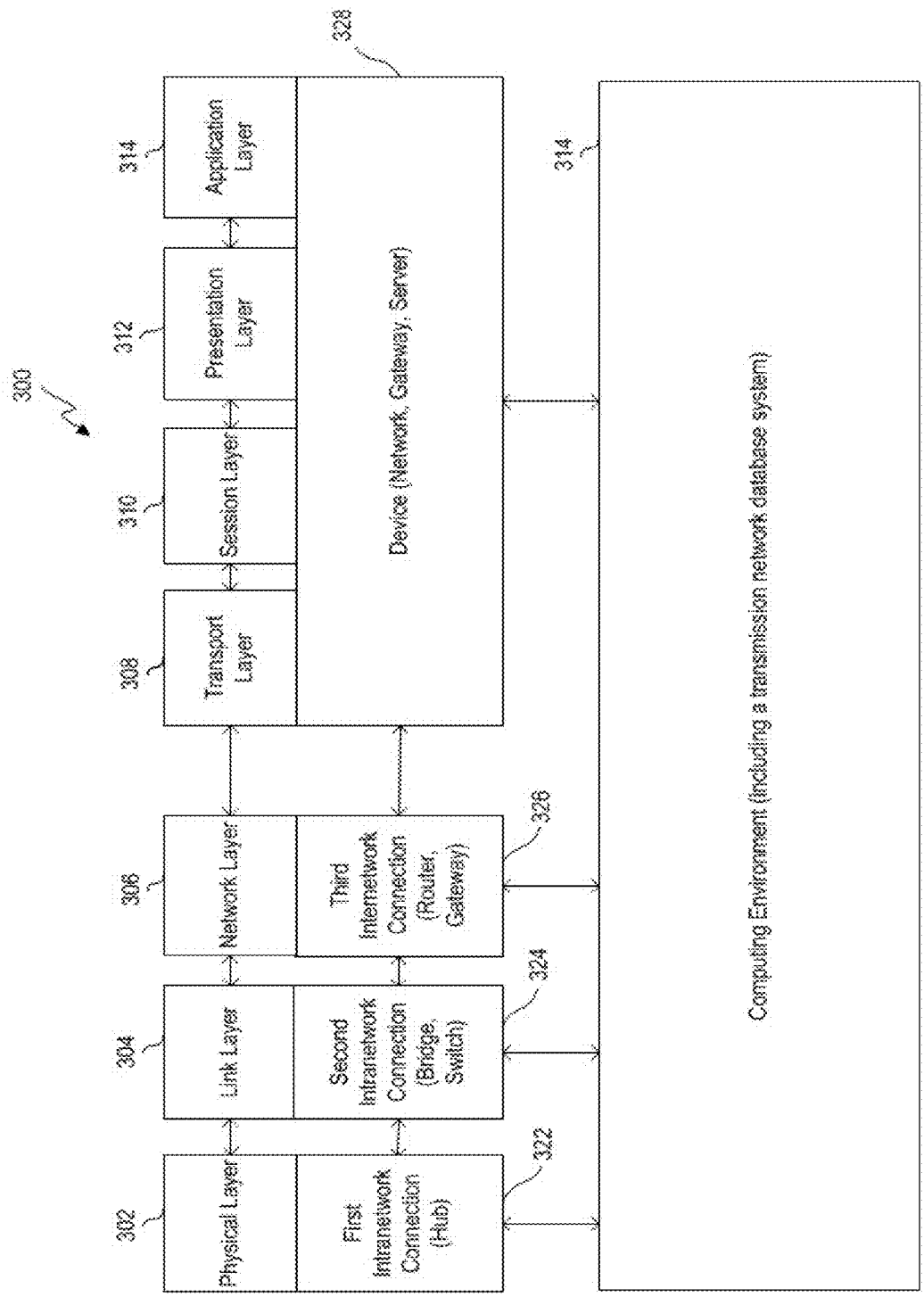
FIG. 3 is a block diagram of a model of an example of a communications protocol system according to some aspects.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic signals. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes noncanonical information to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as a textual analysis application, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326 and 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control devices from which it can receive data from. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for normalizing electronic communications using a neural network.

Figure 4:
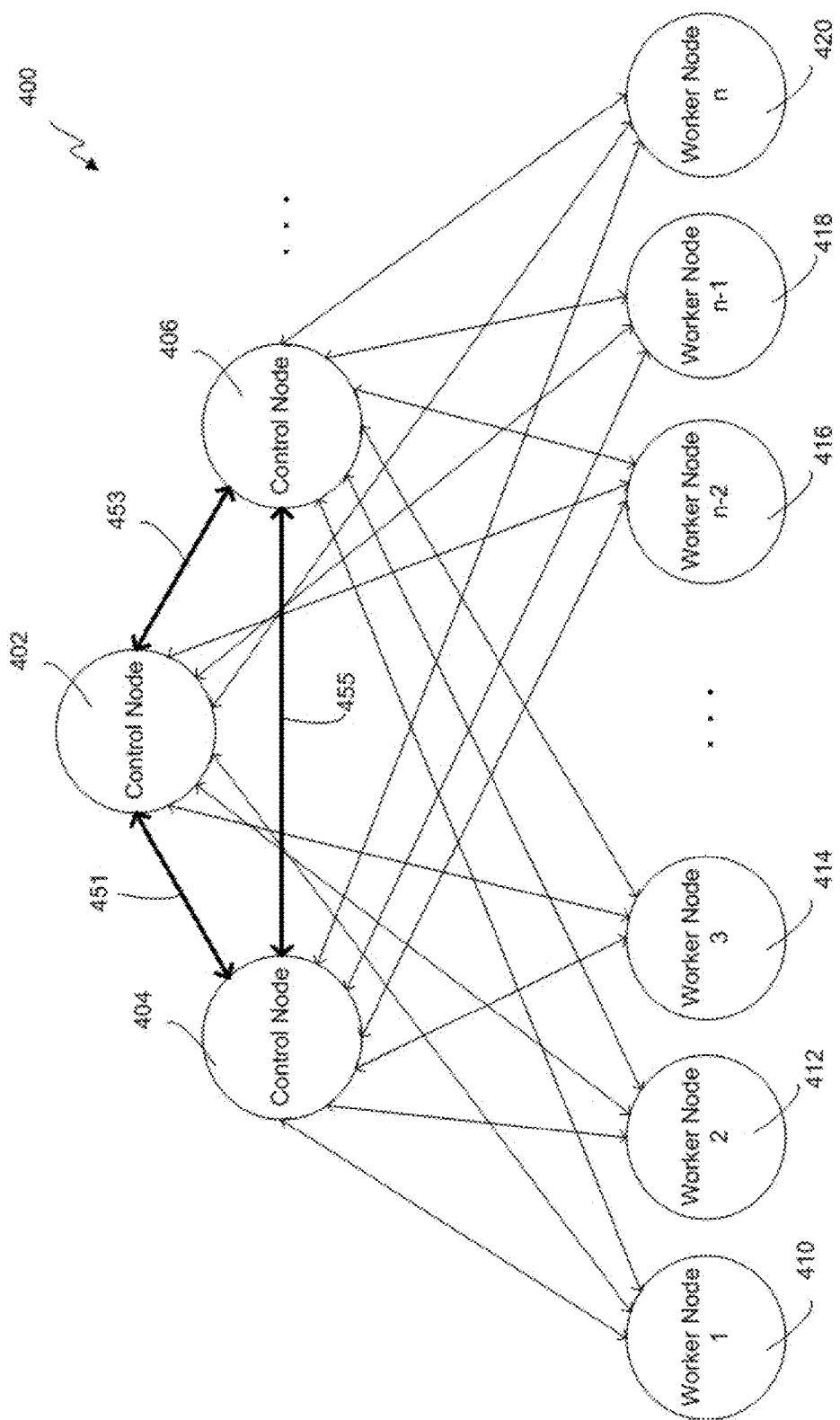
FIG. 4 is a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes 402-406 are communicatively connected via communication paths 451, 453, and 455. The control nodes may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a textual analysis job being performed or an individual task within a textual analysis job being performed by that worker node. In some examples, worker nodes may not be connected (communicatively or otherwise) to certain other worker nodes. For example, a worker node 410 may only be able to communicate with a particular control node 404. The worker node 410 may be unable to communicate with other worker nodes 412-420 in the communications grid, even if the other worker nodes 412-420 are controlled by the same control node 404.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a textual analysis project or a normalization project for transforming a noncanonical communication into a canonical form. The project may include a data set. The data set may be of any size. Once the control node 402-406 receives such a project including a large data set, the control node may distribute the data set or projects related to the data set to be performed by worker nodes. Alternatively, for a project including a large data set, the data set may be receive or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project for normalizing an electronic communication using a neural network can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 402 may perform analysis or normalization on a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 404, 406 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, electronic communications can be normalized using such a communications grid computing system 400.

Figure 5:
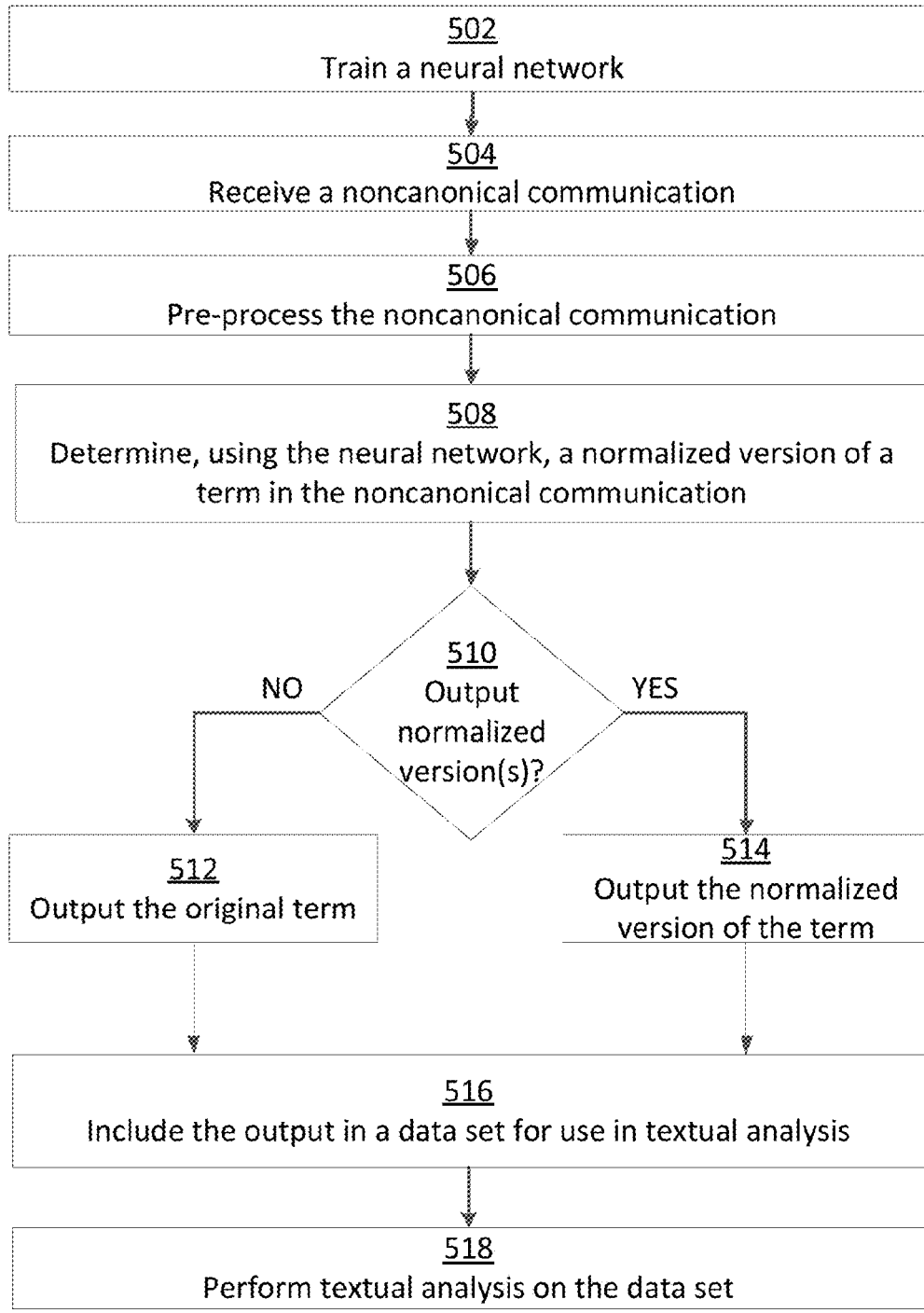
FIG. 5 is a flow chart of an example of a process for normalizing electronic communications using a neural network according to some aspects.

FIG. 5 is a flow chart of an example of a process for normalizing electronic communications using a neural network according to some aspects. Some examples can be implemented using any of the systems and configurations described with respect to FIGS. 1-4.

In block 502, a processor trains a neural network. The neural network can include one or more computer-implemented algorithms or models. Typically, neural networks can be represented as one or more layers of interconnected "neurons" that can exchange data between one another. These layers are different than the layers of the communications protocol system described with respect to FIG. 3. The connections between the neurons can have numeric weights that can be tuned based on experience. Such tuning can make neural networks adaptive and capable of "learning." Tuning the numeric weights can increase the accuracy of output provided by the neural network.

The numeric weights can be tuned through a process referred to as training. In some examples, the processor can train the neural network using training data. The processor can provide the training data to the neural network, and the neural network can use the training data to tune one or more numeric weights of the neural network. In some examples, the neural network can be trained using backpropagation. Backpropagation can include determining a gradient of a particular numeric weight based on a difference between an actual output of the neural network and a desired output of the neural network. Based on the gradient, one or more numeric weights of the neural network can be updated to reduce the difference, thereby increasing the accuracy of the neural network. This process can be repeated to train the neural network. For example, this process can be repeated 150 or more times to train the neural network.

In some examples, training the neural network includes minimizing a difference between a result from the neural network and a desired result. The difference can be referred to as the cost. The cost can be determined according to the following equation:

$$\text{cost} = -\sum_{i=0}^{P} \log_e(p_i)$$

where p is a vector of probabilities for each letter in the desired result and P is a number of dimensions in the vector. The neural network can determine the cost between a result from the neural network and a desired result and back propagate to reduce the cost. For example, a noncanonical term "u" (an erroneous version of the word "you") can be input into the neural network. During training, the neural network can determine that the letter "y" is 75% likely for a first character in the desired result, the letter "o" is 95% likely for a second character in the desired result, and the letter "u" is 89% likely for a third character in the desired result. A negative log likelihood for each letter can be determined to be (0.29, 0.5, 0.12). The negative log likelihoods can be summed together to determine the cost, which can be back propagated through the neural network to train the numeric weights.

In some examples, the neural network is, or includes, a deep neural network. A deep neural network can include a neural network having one or more hidden layers of units ("neurons") between an input layer and an output layer of the neural network. Such layers between the input layer and the output layer may be referred to as "hidden" because they may not be directly observable during the normal functioning of the neural network. A deep neural network can include any number of hidden layers, and each hidden layer can include any number of neurons.

In some examples, the neural network includes a feed forward network. A feed forward network can include a neural network in which every neuron of the neural network only propagates an output value to a subsequent layer of the neural network. For example, data may only move one direction (forward) from one neuron to the next neuron in a feed forward network. A feed forward network can be distinguished from a recurrent neural network, which can include one or more feedback loops, allowing data to propagate in both forward and backward through the neural network.

In some examples, the neural network includes a deep feed-forward neural network, which can combine the above-mentioned features. For example, the deep feed-forward neural network can include one or more hidden layers of neurons, in which the neurons only propagate data in a forward direction through the neural network.

A neural network (e.g., the deep feed-forward neural network discussed above) can receive a vector of numbers from one neural network layer, transform the vector of numbers using a matrix of numeric weights and/or a non-linearity into a new vector of numbers, and provide the new vector of numbers to a subsequent layer of the neural network. Each subsequent layer of the neural network can repeat this process until the neural network outputs a final result.

For example, the neural network can receive a vector of numbers as an input at an input layer. The neural network can multiply the vector of numbers by a matrix of numeric weights to determine a weighted vector. The matrix of numeric weights can be tuned during the training of the neural network. The neural network can transform the weighted vector using a nonlinearity, such as a sigmoid tangent or the hyperbolic tangent. In some examples, the nonlinearity can include a rectified linear unit, which can be expressed using the following equation:

$$y = \max(x, 0)$$

where y is the output and x is an input value from the weighted vector. The transformed output can be supplied to a subsequent layer in the neural network. The subsequent layer of the neural network can receive the transformed output, multiply the transformed output by a matrix of numeric weights and a nonlinearity, and provide the result to yet another layer of the neural network. This process continues until the neural network outputs a final result.

In some examples, the neural network can include a recurrent neural network (RNN). A recurrent neural network can include one or more feedback loops, allowing data to propagate in both forward and backward through the neural network. This can allow for information to persist within the recurrent neural network. In some examples, a recurrent neural network can determine an output based at least partially on information that the neural network has seen before, giving the recurrent neural network the ability to use previous input to inform the output.

Figure 6:
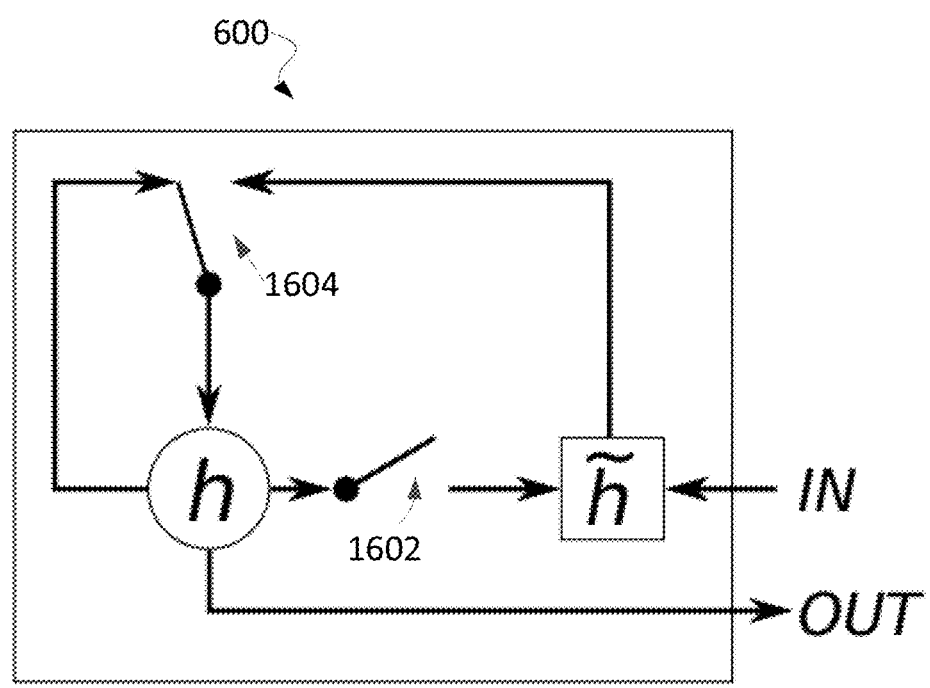
FIG. 6 is a block diagram of an example of a gated recurrent unit according to some aspects.
Figure 7:
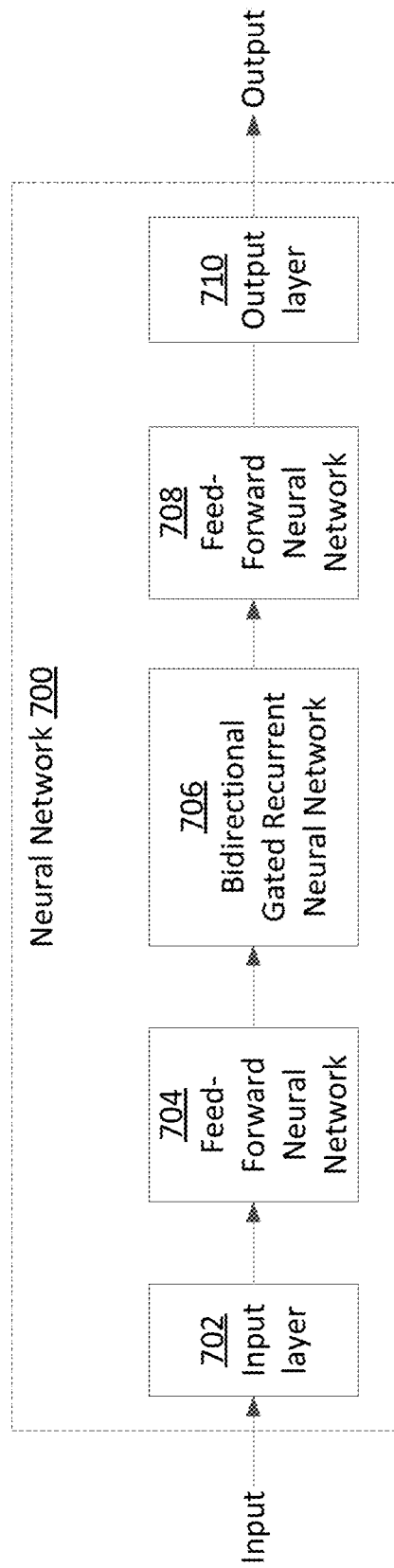
FIG. 7 is a block diagram of an example of a neural network according to some aspects.

In some examples, one or more nodes of a recurrent neural network can include a gated recurrent unit. For example, each node of a hidden layer of a recurrent neural network can be a gated recurrent unit. An example of a gated recurrent unit 600 is shown in FIG. 6. The gated recurrent unit 600 can include an update gate 604 and a reset gate 602. The update gate 604 and the reset gate 602 can adaptively manage the speed at which old information is replaced with new information, and the degree to which new information should rely on old information, respectively. Particularly, the update gate 604 can define how much of the old information to keep or forget. The reset gate 602 can determine how to combine new information with the previous information. For example, the reset gate 602 can weight the influence of a previous hidden state h on a candidate new hidden state $\tilde{h}$. The weight can be a numerical value between 0 and 1. A weight of 0 can mean that the previous hidden state h has no influence on the candidate new hidden state $\tilde{h}$. A weight of 1 can mean that the previous hidden state has complete influence on the candidate new hidden state $\tilde{h}$ The combination of the reset gate 602 and the update gate 604 can allow the gated recurrent unit 600 to retain, combine, or forget information over time.

In some examples, the neural network can include a bidirectional gated recurrent neural network (BGRNN). A BGRNN can include a recurrent neural network having at least two hidden layers. The hidden layers can include gated recurrent units. Each hidden layer can analyze an input in an opposite direction. For example, if the input to the BGRNN is the sentence "the cat sat," one hidden layer can analyze this input in a forward direction (e.g., the→cat→sat), and another hidden layer can analyze this input in a backward direction (e.g., sat→cat→the). The output of the BGRNN can be determined based on the results from the hidden layers. For example, the output of the BGRNN can include a concatenation of values from the hidden layers. In some examples, by analyzing an input in two directions, a BGRNN can better take advantage of the context of a term in an overall input than other types of neural networks. For example, the BGRNN may determine an output more accurately than other types of neural networks based on the context of the word "cat" in the sentence "the cat sat." In some examples, a BGRNN can be usable for analyzing the context of one or more terms in a noncanonical communication to determine a normalized version of the noncanonical communication.

In some examples, the neural network can include multiple sub-neural networks, neural network layers, or any combination of these. For example, referring to FIG. 7, the neural network 700 can include an input layer 702. The input layer 702 can receive input. In some examples, the input layer 702 can perform matrix operations or other calculations and provide a result to another component of the neural network 700, such as feed-forward neural network 704. The feed-forward neural network 704 can receive data from the input layer 702, perform matrix operations or other calculations on the data, and provide a result to another component of the neural network 700, such as BGRNN 706. The BGRNN 706 can receive data from the feed-forward neural network 704, perform matrix operations or other calculations on the data, and provide a result to another component of the neural network 700, such as feed-forward neural network 708. The feed-forward neural network 708 can receive data from the BGRNN 706, perform matrix operations or other calculations on the data, and provide a result to another component of the neural network 700, such as output layer 710. The output layer 710 can perform matrix operations or other calculations and provide a final output of the neural network 700. Other examples can include other combinations of feed-forward neural networks, BGRNNs, and neural network layers.

Referring back to FIG. 5, in block 504, the processor receives a noncanonical communication. The noncanonical communication can include one or more words that are in a noncanonical form. As discussed above, a word can be in a noncanonical form if the word is misspelled according to an accepted and standardized spelling of the word; does not comport with one or more standardized grammatical rules; or both. A shorthand version of a word, a misspelled version of the word, or a grammatically incorrect version of the word can be examples of noncanonical forms of the word.

The processor can receive the noncanonical communication in an electronic form. For example, the processor can receive an electronic representation of the noncanonical communication over a network. In some examples, the noncanonical communication can include data from a forum post, a text message, an e-mail, a social media post (e.g., a Twitter™ tweet or a Facebook™ post), a blog post, an online review, text translated from speech, an electronic document, or any combination of these. In some examples, the noncanonical communication can include data resulting from an OCR process performed on an image.

In block 506, the processor pre-processes the noncanonical communication. In some examples, the processor can pre-process the noncanonical communication by performing one or more steps shown in FIG. 8.

Figure 8:
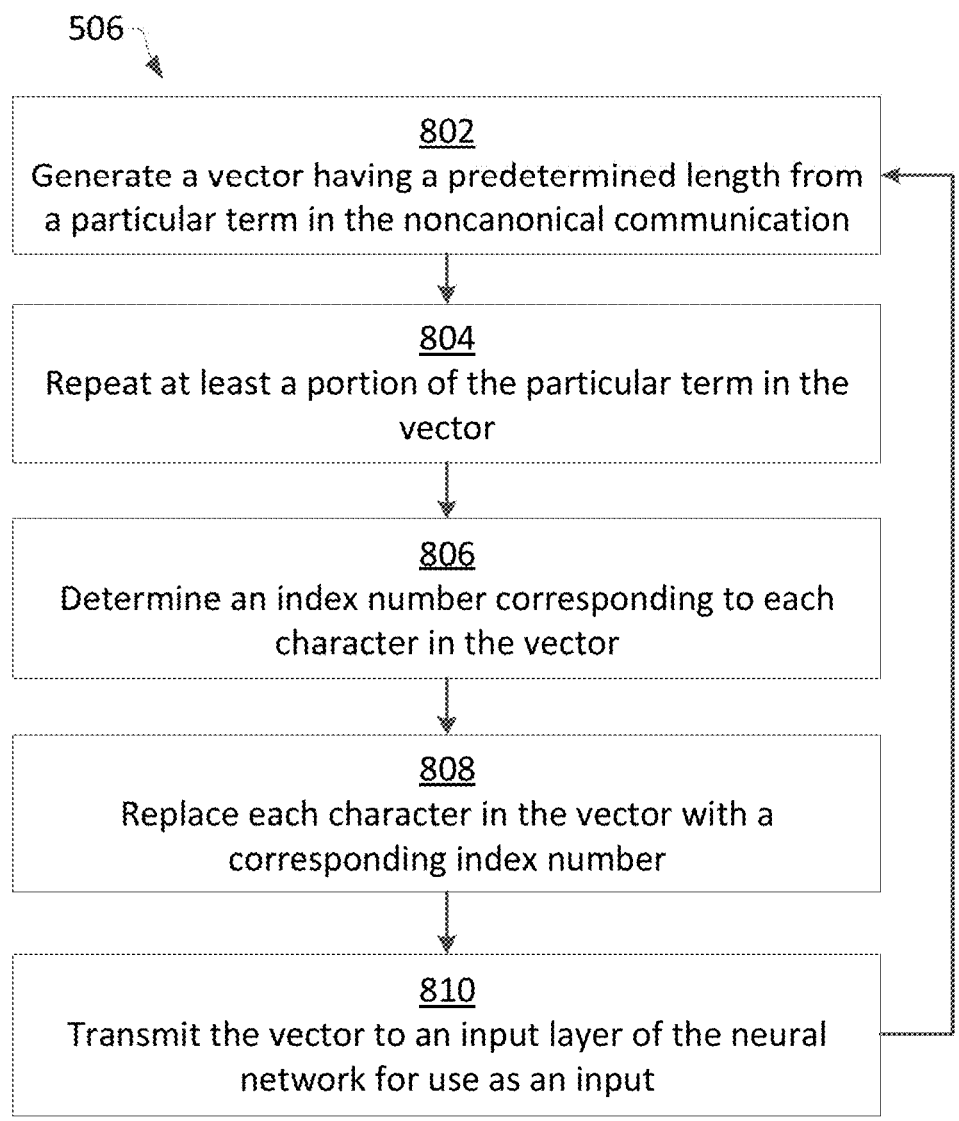
FIG. 8 is a flow chart of an example of a process for pre-processing a noncanonical communication according to some aspects.

Referring to FIG. 8, in block 802, the processor generates a vector having a predetermined length from a term in the noncanonical communication. The vector can include the characters in the term. In some examples, the processor can include one or more padding characters (e.g., at the end of the vector) to extend a length of the vector to the predetermined length. For example, if the noncanonical communication is "u" (an erroneous version of the word "you") and the predetermined length is three, the processor can generate the vector [u, _, _], where "_" is a padding character for extending the length of the vector. In some examples, padding the vector can help ensure that, regardless of the length of the noncanonical communication, the vector is always the same length. This can reduce errors that can result if, for example, a neural network that will use the vector requires an input vector of a specific length.

In some examples, if a number of characters in the noncanonical communication exceeds the predetermined length, each character beyond the predetermined length may not be included in the vector. For example, if the noncanonical communication is "hellop" (an erroneous form of the word "hello") and the predetermined length is four characters, the processor may generate the vector [h, e, l, l]. In some examples, the predetermined length can be selected such that the vector is long enough to include most words. For example, the predetermined length can be 25 characters, which can be long enough to encompass most words in the English language. This can reduce the chance of characters being cut from or not included in the vector.

In block 804, the processor repeats at least a portion of the particular term in the vector. For example, if the term is "cat" and the vector has a predetermined length of ten, the processor may repeat the term "cat" at the end of the vector, resulting in the vector [c, a, t, _, _, _, _, c, a, t]. As another example, if the term is "cat" and the vector has a predetermined length of six, the processor may repeat the term "cat"

at the end of the vector, resulting in the vector [c, a, t, c, a, t]. If the length of the vector is not long enough to repeat the entire term, the processor can repeat a substring or portion of the term at the end of the vector. For example, if the term is "intrigue" and the vector has a predetermined length of ten, the processor can repeat the last two letters of "intrigue" (e.g., "ue") at the end of the vector, resulting in the vector [i, n, t, r, i, g, u, e, u, e]. In some examples, by repeating the last characters of a term at the end of the vector, the last characters of the term can be in fixed, known positions in the vector. This can be advantageous when the vector is later analyzed. If the length of the vector is not long enough to repeat any of the term, then the vector can just include the term. For example, if the term is "sky" and the vector has a predetermined length of three, the processor may not repeat any letters of "sky" at the end of the vector, resulting in the vector [s, k, y].

In block 806, the processor determines an index number corresponding to each character in the vector. For example, each character in the vector can be mapped to a corresponding index number in a lookup table. In one example, a blank space in the vector can be mapped to an index number of 0 in the lookup table. The letter "u" in the vector can be mapped to an index number of 21 in the lookup table, because "u" can be the twenty-first word in the English alphabet. The processor can access the lookup table and determine an index number corresponding to each character in the vector. In other examples, the processor can use an algorithm to determine index numbers corresponding to each character in the vector.

In block 808, the processor replaces each character in the vector with a corresponding index number. For example, the processor can replace the "u" and the blank space ("_") in the vector [u, _, u] with corresponding index numbers, resulting in the vector [21, 0, 21]. As another example, the processor can replace the characters in the vector [c, a, t, _, c, a, t] with corresponding index numbers, resulting in the vector [3, 1, 20, 0, 3, 1, 20]. Some examples may not perform the steps in blocks 806-808, and may instead use the vector of letters determined in block 804 (e.g., [c, a, t, _, c, a, t]) as the vector.

In block 810, the processor transmits the vector to an input layer (e.g., a character projection layer) of the neural network for use as an input. The neural network can receive the vector at the input layer and perform one or more operations on the vector to generate an output.

Returning back to FIG. 5, in block 508, the processor determines a normalized version of a term in the noncanonical communication using the neural network. The processor can also determine if the normalized version of the term should be output using the neural network. In some examples, the neural network can determine the normalized version of the noncanonical communication, if the normalized version should be output, or both by performing one or more steps shown in FIG. 9.

Figure 9:
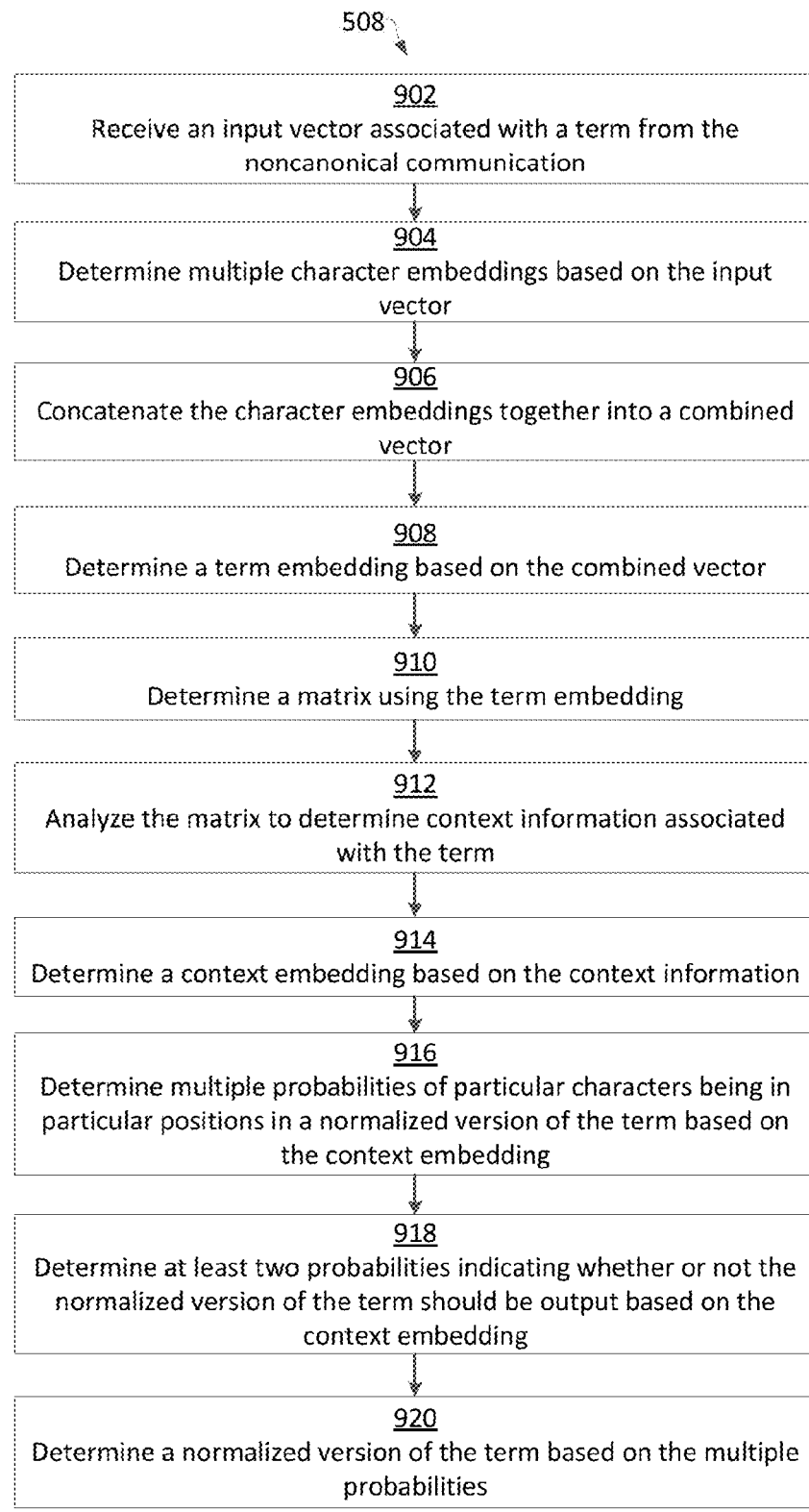
FIG. 9 is a flow chart of an example of a process for determining a normalized version of a term in a noncanonical communication according to some aspects.

Referring now to FIG. 9, in block 902, the neural network receives an input vector associated with a term from the noncanonical communication. The neural network can receive the input vector at a character projection layer. The input vector can be generated according to one or more of the steps discussed with respect to FIG. 8.

In block 904, the neural network determines multiple character embeddings based on the input vector. Each character embedding can include one or more floating-point numbers representing an element in the input vector. For example, if the input vector is [u, _, u], the vector representation for the letter "u" can be [0.1, −1.2, −0.3]., and the vector representation for the padding character "_" can be [1.3, 0.0, −1.1]. Alternatively, if the input vector is [21, 0, 21] (e.g., representing the input vector [u, _, u]), the character projection layer can determine that a character embedding for the number "21" is the vector [0.1, −1.2, −0.3], and that the character embedding for the number 0 is the vector [1.3, 0.0, −1.1]. By representing each element in the input vector as one or more floating-point numbers, rather than a single integer, more information can be associated with the elements. In some examples, the neural network can learn the character embeddings corresponding to the elements in the input vector during training.

In block 906, the neural network concatenates all of the character embeddings together into a single, combined vector. For example, the processor can concatenate the vector representation corresponding to the letter "u" (e.g., [0.1, −1.2, −0.3]) with the vector representation corresponding to "_" (e.g., [1.3, 0.0, −1.1]) into a single vector: [0.1, −1.2, −0.3, 1.3, 0.0, −1.1, 0.1, −1.2, −0.3] representative of the vector [u, _, u]. The combined vector can be longer than a vector representation for a particular character. For example, the combined vector can be nine floating-point numbers long, while a vector representation for a particular character can be three floating-point numbers long.

In block 908, the neural network determines an embedding for the term as a whole (a "term embedding") based on the combined vector. For example, the combined vector can be transmitted to a feed-forward neural network of the neural network. The feed-forward neural network can perform one or more matrix operations, such as a linear transformation followed by a nonlinear transformation, on the combined vector to determine the term embedding. In some examples, the nonlinear transformation can include applying a rectified linear unit that is equal to x if x>0, or equal to 0 if x≤0.

In block 910, the neural network determines a matrix using the term embedding. In some examples, the neural network can generate the matrix using term embeddings for all of the terms in the noncanonical communication. For example, if the noncanonical communication includes the sentence "u think ur so smart," the neural network can determine a term embedding representing the term "u" (e.g., as discussed above), another term embedding representing the term "think," another term embedding representing the term "ur," etc. The neural network can generate the matrix by concatenating together all of the term embeddings in the order in which the associated terms are positioned in the noncanonical communication. In some examples, the neural network can add padding to the end of the matrix (e.g., a padding vector) to ensure that the matrix is always the same length, regardless of the length of the noncanonical communication.

In some examples, the matrix can be referred to as a context matrix, because the order of the elements in the matrix can correspond to the positions of the terms in the noncanonical communication. For example, the term embedding representing "u" can come first in the matrix, and "u" is the first term in the noncanonical communication. The term embedding representing "think" can come second in the matrix, and "think" is the second term in the noncanonical communication. The term embedding representing "ur" can come third in the matrix, and "ur" is the third term in the noncanonical communication. And so on. Thus, the positions of the term embeddings in the matrix capture the order of, and the context surrounding, the terms in the noncanonical communication.

Additionally or alternatively, the matrix can be generated by first indexing the terms in the noncanonical communication. For example, if the noncanonical communication is "u think ur so smart," the terms can be alphabetically sorted to "smart, so, think, u, ur." Because "u" is the fourth letter in the above alphabetical list, "u" can be assigned an index number of 4. Because "think" is the third letter in the above alphabetical list, "think" can be assigned an index number of 3. Because "ur" is the fifth letter in the above alphabetical list, "ur" can be assigned an index number of 5. And so on. A vector can be generated that includes the index numbers in an order corresponding to the order of the terms in the noncanonical communication. For example, the vector can be [4, 3, 5, 2, 1], representing the noncanonical communication "u think ur so smart." Some examples can include padding at the end of the vector to ensure the vector is always the same length, regardless of the length of the noncanonical communication. For example, the vector can be [4, 3, 5, 2, 1, 0, 0], with each 0 being padding. Thereafter, the neural network can replace each index number with a corresponding term embedding. For example, the neural network can replace the number 4 in the vector with a term embedding associated with the term "u." The neural network can repeat this process for each index number in the vector, resulting in the matrix.

In block 912, the neural network analyzes the matrix (context matrix) to determine context information associated with the term. For example, the matrix can be transmitted to a BGRNN. The BGRNN can "look" at the position of the term in the noncanonical communication from two directions to determine the context surrounding the term. For example, the BGRNN can use one hidden layer to read the matrix in a forward direction until the BGRNN reaches the term in the overall noncanonical communication. The BGRNN can also use another hidden layer to read the matrix in a backward direction, starting from the end of the matrix, until the BGRNN reaches the term in the overall noncanonical communication. The BGRNN can then concatenate the results from the two hidden layers into a single result representative of context information associated with the term. The BGRNN can repeat this process for each term to determine context information associated with each term in the noncanonical communication.

In block 914, the neural network determines a context embedding based on the context information. The context embedding can be an abstract representation of the term and the term's context in the noncanonical communication. For example, the results from the BGRNN can be transmitted to another feed-forward neural network of the neural network. The feed-forward neural network can perform one or more matrix operations, such as a linear transformation followed by a nonlinear transformation, on the results from the BGRNN to determine the context embedding. In some examples, the nonlinear transformation can include applying a rectified linear unit that is equal to x if x>0, or equal to 0 if x≤0. The neural network can determine a context embedding for every word in the noncanonical communication.

In block 916, the neural network determines multiple probabilities of particular characters being in particular positions in a normalized version of the term based on the context embedding. For example, the context embedding can be transmitted to an output layer (e.g., a multi-softmax layer) of the neural network. The output layer can use a feed-forward layer to generate a prediction of the most likely character in each position of the normalized version of the term, as well as a flag indicating whether the term should be normalized or left as-is (as discussed in greater detail below).

To generate the probabilities, the output layer can apply a nonlinear transformation to the context embeddings. The nonlinear transformation can include a softmax operation. The softmax operation can transform a vector so that each of the vector's values is positive and all of the elements in the vector sum to one. In some examples, the softmax operation can be implemented using the following equation:

$$\sigma(z)_j = \frac{e^{z_j}}{\sum_{k=1}^{K} e^{z_k}} \text{ for } j = 1, \ldots, K$$

where $\sigma(z)_j$ is K-dimensional vector of real values in the range from 0 to 1, z is an input vector, k is a value in the vector, and K is a number of dimensions in the matrix.

Figure 10:
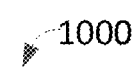
FIG. 10 is an example of a matrix including multiple probabilities according to some aspects.

An example of a result of the output layer is shown in FIG. 10. For each row 1002-1005 in the matrix 1000, all of the numbers in the row sum to one. For example, in row 1002, the numbers (probabilities) 0.40, 0.30, and 0.30 sum to one. Thus, each number in the matrix 1000 can represent a probability.

In some examples, the rows 1002-1004 in the matrix 1000 can correspond to character positions in the normalized version of the term. For example, row 1002 can correspond to the first letter in the normalized version of the term, row 1003 can correspond to the second letter in the normalized version of the term, row 1004 can correspond to the third letter in the normalized version of the term, etc. The columns 1008-1010 can correspond to characters. For example, column 1008 can correspond to the letter "o," column 1009 can correspond to the letter "u", column 1010 can correspond to the letter "y," etc. And the row 1005 can correspond to whether or not the normalized version of the term should be output, as described in greater detail below. Thus, the matrix 1000 can be a(w+1) in size, where a is a total number of possible characters (including a padding character), w is the size of a normalized version of the term, and the +1 is associated with the flag indicating whether the term should be normalized or left as-is. In some examples, a can include 96 characters or more. But for simplicity, in FIG. 10, the matrix 1000 only includes three rows and three columns.

Although in the above discussion the columns 1008-1010 in the matrix 1000 correspond to characters and the rows 1002-1004 in the matrix 1000 correspond to the positions of the characters in the normalized version of the term, numerous other mapping schemes may be possible. For example, an opposite configuration may be possible, in which the rows 1002-1004 of the matrix 1000 can correspond to characters and the columns 1008-1010 in the matrix 1000 can correspond to the positions of the characters in the normalized version of the term.

Referring back to FIG. 9, in block 918, the neural network can determine at least two probabilities indicating whether or not the normalized version of the term should be output. Although this step is described separately from block 916, in some examples, the output layer of the neural network can determine the at least two probabilities indicating whether or not the normalized version of the term should be output simultaneously to determining the multiple probabilities of particular characters being in particular positions in a normalized version of the term.

In some examples, the original term can actually be correct or in a desired format, or can include one or more special features. For example, the term can include a hashtag, a foreign word, a uniform resource locator (url), or other special data. The neural network can detect such special features and determine such terms are in a protected category. If the term falls within a protected category, the neural network can determine that the term itself should be output, rather than a normalized version of the term. This can prevent the "correction" of terms that may not need to be corrected or may be incorrect if corrected, such as with URLs.

An example of the at least two probabilities determined by the neural network is shown in row 1005 of FIG. 10. Column 1008 can indicate a probability that the normalized version of the term should be output. For example, the 0.7 in column 1008 can indicate a 70% probability that the normalized version of the term should be output. Column 1009 can indicate a probability that the normalized version of the term should not be output. For example, the 0.2 in column 1009 can indicate a 20% probability that the normalized version of the term should be output. The remaining column 1010 can be extraneous and for the purpose of extending a length of the row 1005 to be the same length as the rest of the rows in the matrix 1000. This can allow for all of the results in the matrix 1000 to be determined simultaneously using matrix operations (e.g., matrix multiplication).

In some examples, the neurons of the output layer associated with whether or not the normalized version should be output, which can be referred to as flagger neurons, can be weighted. For example, if the flagger neurons are trained like the other neurons in the output layer, the flagger neurons may be only given as much weight as an individual character and may be undertrained. To overcome this issue, the cost for the flagger neurons can be separately calculated and the flagger neurons can be assigned a hyperparameter weight. In some examples, the hyperparameter weight can be 1.

Referring back to FIG. 9, in block 920, a normalized version of the term is determined based on the multiple probabilities (e.g., by the processor or the neural network). For example, as shown in FIG. 10, the highest probability in row 1002 can be 0.40 (e.g., 40%), the highest probability in row 1003 can be 0.70 (e.g., 70%), and the highest probability in row 1004 can be 0.50 (e.g., 50%). A character associated with the highest probability in each row can be determined by mapping the column in which the highest probability is found to a particular character (e.g., using a lookup table). For example, the probability 0.40 can be mapped to the letter "y," because 0.40 is in column 1010, and column 1010 can be mapped to the letter "y." The probability 0.70 can be mapped to the letter "o," because 0.70 is in column 1008, and column 1008 can be mapped to the letter "o." The probability 0.50 can be mapped to the letter "u," because 0.50 is in column 1009, and column 1009 can be mapped to the letter "u." Because each row can correspond to a particular character position in the normalized version of the term, the determined characters can be arranged in the correct order to generate the normalized version of the term. For example, the neural network or the processor can arrange the determined characters into the normalized version of the term, "you."

Referring back to FIG. 5, in block 510, the processor determines whether or not the normalized version of the term should be outputted. For example, as shown in FIG. 10, because the probability in column 1008 is greater than the probability in column 1009, the processor can determine that the normalized version of the term should be output. If the probability in column 1008 is less than the probability in column 1009, the processor can determine that the normalized version of the term should not be output. If the processor determines that the normalized version of the term should be output, the process proceeds to block 514 of FIG. 5 and the processor outputs the normalized version of the term. In some examples, the processor may strip off padding spaces or other extraneous characters before outputting the normalized version of the term. Otherwise, the process proceeds to block 512 and the processor outputs the original version of the term.

In block 516, the processor can include the output in a data set. The data set can be usable for textual analysis. For example, the data set can be configured to be analyzed to detect one or more characteristics or trends associated with the data set. In one example, the processor can include the output in a data set that includes multiple Twitter™ tweets. The data set can be analyzed using a textual analysis program to determine a customer sentiment about a brand indicated by the Twitter™ tweets.

In block 518, the processor performs textual analysis on the data set. For example, the processor can use a textual analysis program (e.g., stored in memory) to analyze one or more characteristics of the data set to determine a trend, pattern, or other information indicated by the data set. The processor can provide such information to a user. Examples of such information can include a sentiment, such as a user sentiment about a brand; an emotion, such as an emotion tied to a particular product launch; a statistic, such as a number of times a user posted about a particular product; etc.

Although the steps of FIGS. 5, 8, and 9 are described sequentially for simplicity, it should be understood that many of the steps can be performed concurrently. Additionally, although the steps of FIGS. 5, 8, and 9 are described with respect to analyzing a single noncanonical term for simplicity, in some examples, the neural network can analyze multiple terms concurrently. For example, the neural network may simultaneously analyze an entire noncanonical communication, such as an entire tweet, and output normalized versions of any noncanonical terms as necessary.

Figure 11:
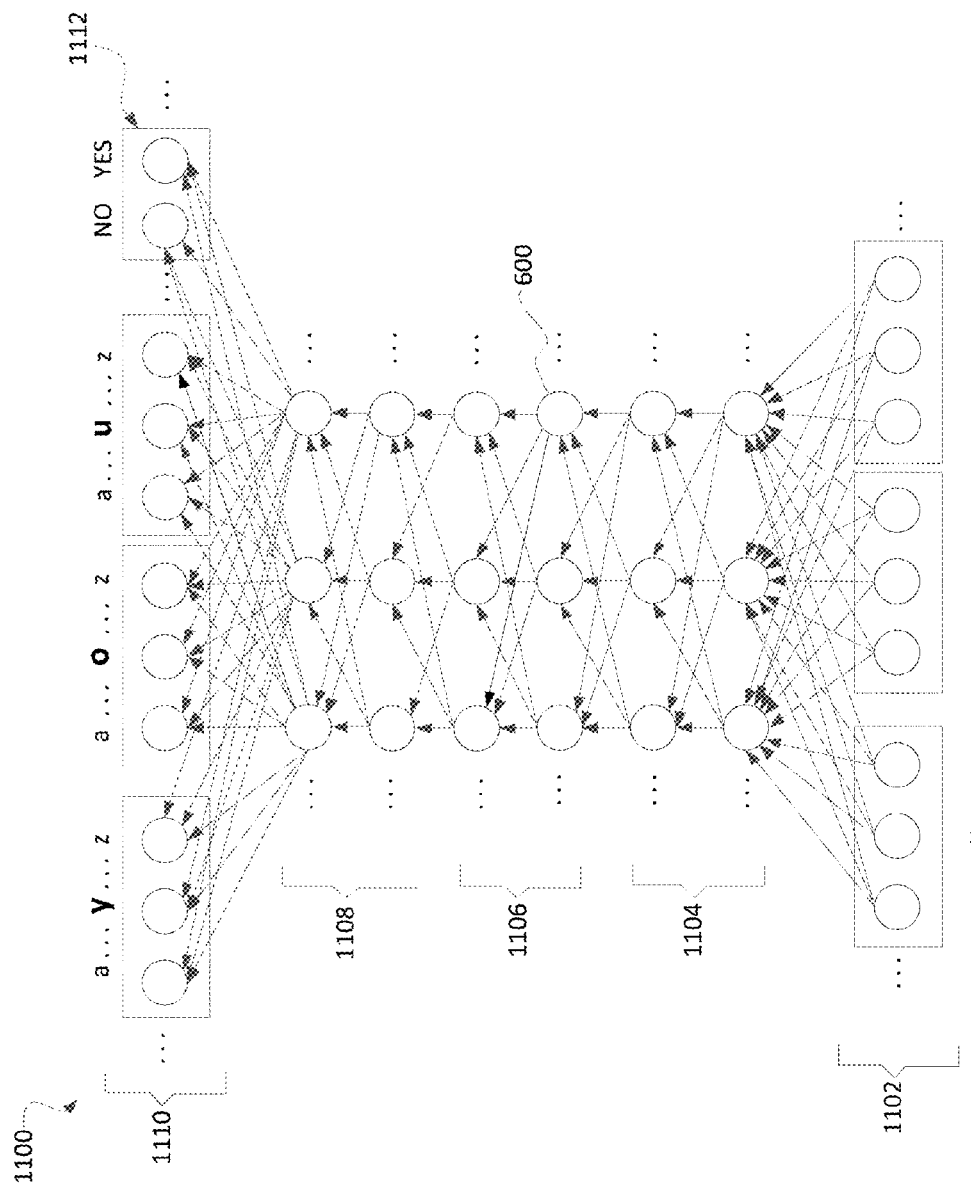
FIG. 11 is a model of an example of a neural network according to some aspects.

FIG. 11 is a model of an example of a neural network 1100 according to some aspects. The neural network 1100 includes an input layer 1102. The input layer can receive, for example, an input vector [y, u, _] associated with the noncanonical term "yu" in the sentence "yu are mean." The input layer 1102 can generate character embeddings associated with elements in the input vector. For example, the input layer 1102 can generate a vector of three floating-point numbers representative of the letter "y" in the input vector. The input layer 1102 can generate a vector of three floating-point numbers representative of the letter "u" in the input vector. The input layer 1102 can generate a vector of three floating-point numbers representative of the character "_" in the input vector. The three floating-point numbers associated with each character can be represented by three neurons (circles) in the input layer 1102.

The neural network 1100 can include a feed-forward neural network 1104. The feed-forward neural network 1104 can include any number of neurons and any number of hidden layers. For simplicity, in this example, the feed-forward neural network 1104 includes two hidden layers, with each hidden layer including three neurons. But in some examples, the hidden layers can each include 2000 or more neurons. The input layer 1102 can transmit the character embeddings to the feed-forward neural network 1104, which can perform matrix operations on the character embeddings.

The neural network 1100 can include a BGRNN 1106. In this example, the BGRNN 1106 includes two hidden layers.

For simplicity, in this example, each hidden layer includes three neurons. But the hidden layers of the BGRNN 1106 can include any number of neurons. In some examples, one or more of the neurons can include gated recurrent units 600. The feed-forward neural network 1104 can transmit data to the BGRNN 1106, which can receive the data and analyze the data. One hidden layer can analyze the data in one direction, and another hidden layer can analyze the data in the opposite direction.

The neural network 1100 can include another feed-forward neural network 1108. The feed-forward neural network 1108 can include any number of neurons and any number of hidden layers. The BGRNN 1106 can transmit data to the feed-forward neural network 1108, which can perform matrix operations on the data.

The neural network 1100 can include an output layer 1110. In some examples, the output layer 1110 can include a multi-softmax layer for performing a softmax operation on data from the BGRNN 1106 and outputting one or more probabilities. The probabilities can indicate a likelihood of particular characters being in particular positions in a normalized version of a noncanonical term. The bolded letters in FIG. 11 can be the characters associated with the highest probabilities, indicating that the normalized version of the noncanonical term is "you."

The probabilities can additionally or alternatively indicate whether the normalized version of the noncanonical term should be output. For example, one neuron shown in box 1112 (e.g., the neuron with "NO" above it) can indicate that the normalized version of the noncanonical term should not be output. Another neuron shown in box 1112 (e.g., the neuron with "YES" above it) can indicate that the normalized version of the noncanonical term should be output.

The neural network 1100 can, in some examples, operate simultaneously at the character level and the word level, performing both character-level corrections and word-level corrections to generate the normalized version of the noncanonical term. For example, the neural network 1100 can construct the normalized version of the term character-by-character, while also using the BGRNN 1106 to perform context analysis, thereby increasing the accuracy that the normalized version of the term is correct. This can result in a more accurate output from the neural network 1100. In some examples, normalizing a noncanonical term by constructing the normalized version of a noncanonical term character-by-character (e.g., rather than selecting the normalized version from a list) can allow the system to normalize to a correct word that did not appear in the training data. Further, some examples can correct for syntax errors and other grammatical errors, in additional to word misspellings.

Example of an Implementation

In some examples, the neural network can be implemented using Theano, a Python library for fast evaluation of multi-dimensional arrays using matrix operations. Theano can include program code for training the neural network through backpropagation.

Figure 12:
FIG. 12 is a table of parameters for an example of an implementation according to some aspects.

The neural network can include the features shown in table 1200 of FIG. 12. As shown in the table 1200, the neural network can include an input layer that generates character embeddings that are each 10 floating-point numbers in length. The neural network can also include a first feed-forward neural network (a "character-level feed-forward neural network) that includes two hidden layers, with each hidden layer having 3200 nodes. The neural network can also include a BGRNN that includes two hidden layers, with each hidden layer having 800 nodes. The neural network also includes a second feed-forward neural network (a "context-level feed-forward neural network) having one hidden layer with 1600 nodes. The neural network can have a 50% dropout rate, where a dropout rate can include a number or percentage of hidden nodes for each layer of a neural network randomly excluded from consideration during training.

In some examples, the training data for training the neural network can be separated into a first data set and a second data set. The first data set can include 95% of the training data and can be used for training the neural network. The second data set can include 5% of the training data and can be used for validation of the system. The neural network can be trained by iterating the training process (using the first data set) multiple times. For example, the neural network can be trained by iterating the training process hundreds or thousands of times. In the implementation of FIG. 12, the neural network can be trained for between 500 and 1000 iterations, after pre-training (discussed in greater detail below). The neural network can be trained by iterating the training process until there is minimal, or no, observable improvement in the results for a predetermined number of iterations (e.g., 500 iterations).

In some examples, layer-wise pre-training can be used to train a neural network. In layer-wise pre-training, the neural network is first trained with zero hidden layers (e.g., going directly from an input layer to an output layer), then trained with one hidden layer, then trained with two hidden layers, etc. In some examples, training the neural network of the normalizer can take six hours or more.

The neural network may not require labor-intensive, manual engineering of features (e.g., humans determining what features to use for training the various neural networks), making the neural network easier to implement and more generally applicable. For example, rather than the neural network being manually engineered with specific features for a particular application, the neural network may be able to accurately determine normalized versions of noncanonical terms across multiple applications.

One example of a result using the neural network is shown in FIG. 13. The noncanonical text to be normalized, which is from a tweet, is designated as "Input" in FIG. 13. A desired output from the neural network is designated as "Gold" (i.e., the "gold standard") in FIG. 13. FIG. 13 shows the output from four different text-normalizers, with the neural network of the present application being designated as "DeepNorm." As shown, DeepNorm provides a more accurate result than both of the CLS™ approaches, which are specifically designed for use in optical character recognition applications. DeepNorm provides an equally accurate result to the Skip-Bigram approach, which is specifically designed for use in tweet normalization applications. Another example of a result using the neural network is shown in FIG. 14. The noncanonical text to be normalized, which is noisy text from an optical character recognition process, is designated as "Input" in FIG. 14. A desired output from the neural network is designated as "Gold" in FIG. 14. FIG. 14 shows the output from four different text-normalizers, with the neural network of the present application being designated as "DeepNorm." As shown, DeepNorm provides a more accurate result than the Skip-Bigram approach, which is specifically designed for use in tweet normalization applications. And both DeepNorm and CLS™ by Word have one incorrect word, while the CLS™ by Sentence approach performs slightly better than DeepNorm.

It is apparent from the results in FIGS. 13-14 that DeepNorm performs better than other text-normalization methods when those text-normalization methods are applied outside their specifically intended applications. DeepNorm performs as well, or almost as well, as the other text-normalization methods when those text-normalization methods are applied as intended. Thus, DeepNorm may provide a more generally applicable, and substantially as accurate, approach to performing text normalization.

Supervised, Unsupervised, and Semi-Supervised Training

Neural networks are typically trained in one of three ways: (1) supervised training, (2) unsupervised training, or (3) semi-supervised training. In supervised training, the training data used to train a neural network includes noncanonical terms annotated with their correct canonical forms. This annotation can be performed by humans and tends to be costly and labor intensive. In unsupervised training, the training data is not annotated. The cost and time savings using this approach can be significant. But unsupervised training can have its own challenges, so supervised and unsupervised approaches can be combined into a third approach, semi-supervised training.

Figure 15:
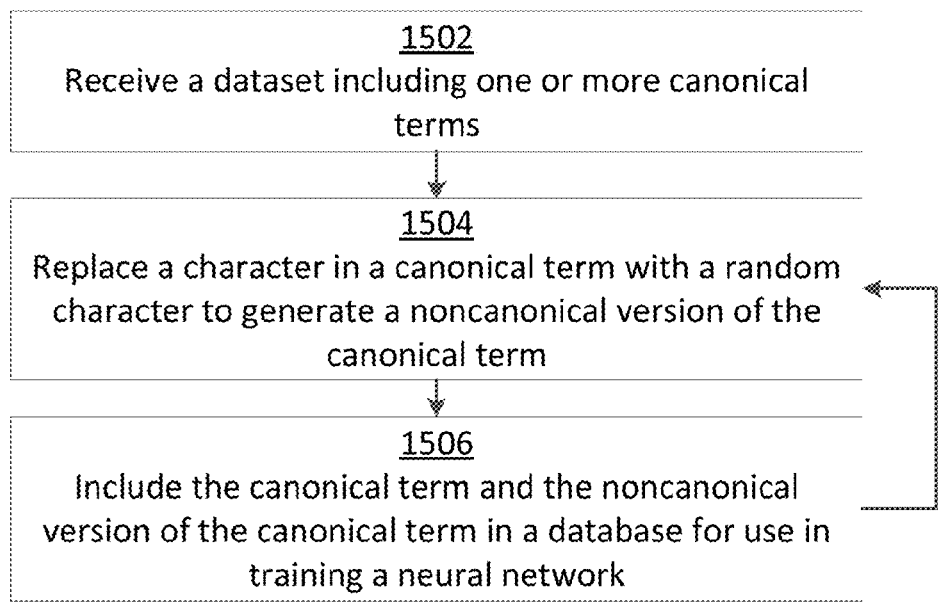
FIG. 15 is a flow chart of an example of a process for generating training data according to some aspects.
Figure 16:
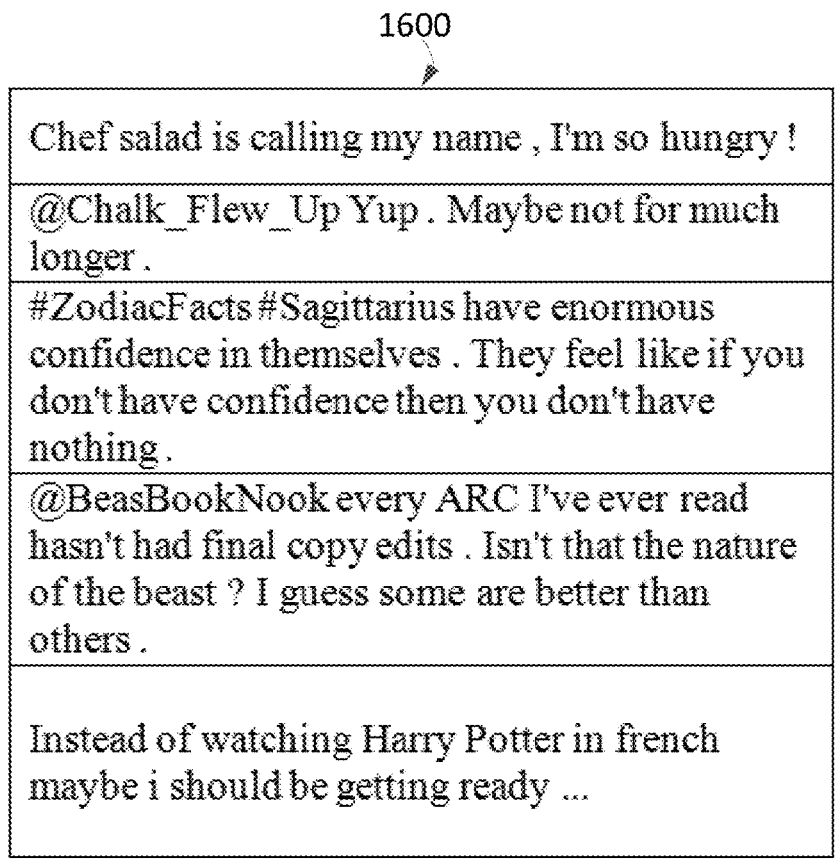
FIG. 16 is a table of an example of clean tweets according to some aspects.

In some examples, annotated training data for use in supervised training can be automatically generated, thereby obtaining the benefits of supervised training without the associated drawbacks. FIG. 15 is a flow chart of an example of a process for generating training data according to some aspects.

In block 1502, a processor receives a dataset that includes one or more canonical terms. A canonical term can be the opposite of a noncanonical term. For example, a canonical term can be a term that is properly spelled, grammatically correct, or otherwise errorless.

In some examples, the dataset can include tweets. For example, the dataset can include the National Institute of Standards and Technology's 2011 Twitter dataset. Tweets can naturally be in their erroneous, noncanonical form (as compared to kinds of data, which can naturally be in a more normalized form). For example, tweets can naturally include shorthand, slang, or other noncanonical features. In some examples, it can be desirable to use a subset of the tweets in the dataset determined to be in a substantially normal form. A tweet that is in a substantially normal form can be referred to as a clean tweet. The processor can determine that a particular tweet is a clean tweet by comparing the terms in the tweet to a dictionary. If, other than tweetcode, the processor determines that the tweet only includes words in the dictionary, the processor can determine that the tweet is a clean tweet. Examples of clean tweets are shown in the table 1600 of FIG. 16. In some examples, the dataset can include 16 million or more tweets, and the subset of clean tweets extracted from the dataset can be around 2 million tweets. While the clean tweets may still include slang, using only the clean tweets can result in a more accurate neural network (after training) than using unclean tweets.

In some examples, the dataset can be data derived using an OCR process. For example, the dataset can be derived by performing OCR on the book The Adventures of Sherlock Holmes ("Sherlock Holmes"). Sentences from Sherlock Holmes can be randomly selected to generate the dataset. For example, the dataset can include 500,000 words derived from randomly selected sentences from Sherlock Holmes.

In some examples, the dataset can include transcripts generated using a speech-to-text analysis program or other methods. For example, transcriptions of authors reading their books can be used for the dataset. Such a dataset can include 4.5 million words.

In some examples, the dataset can further be split into sub-datasets. Each sub-dataset can include a predetermined number of words, such as 250,000 words. This can reduce the memory space required for training the neural network at any given time, because the neural network can be sequentially trained using the 250,000 word data sets, rather than a single dataset having millions of words.

In block 1504, the processor replaces a character in a canonical term with a random character to generate a noncanonical version of the canonical term. For example, for each character in a canonical term, the processor can determine if the character should be left as-is or substituted with another random character. In an example in which the canonical term is "hello," the processor can determine for each character in the term "hello" if the particular character should remain as-is or be substituted with a random character. A noncanonical term resulting from this process may be, for example, "hzlly."

In some examples, the processor can substitute characters in the canonical term with random characters 30% of the time. Thus, approximately a third of the characters in the term can be randomized. Substituting random characters into the canonical term can result in a noncanonical version of the canonical term that is more challenging to identify than if other approaches are used, such as simply removing characters (e.g., replacing characters with a blank space) from the canonical term.

In block 1506, the processor can include the canonical term and the noncanonical version of the canonical term in a database for use in training a neural network. For example, the processor can include the canonical term "hello" mapped to its corresponding noncanonical version "hzlly" in the database. The processor can repeat steps 1504-1506 for all of the terms in the dataset, thereby generating a database of annotated training data. Thereafter, the processor can use the database to train the neural network (e.g., according to a supervised or a semi-supervised training method).

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A non-transitory computer readable medium comprising program code executable by a processor for causing the processor to:
   receive an electronic representation of a noncanonical communication, the noncanonical communication including multiple terms;
   preprocess the noncanonical communication by:
      generating a vector comprising a plurality of characters from a term of the multiple terms, the vector having a predetermined length greater than a length of the term; and
      repeating a substring of the term in the vector such that a last character of the substring is positioned in a last position in the vector, wherein the last character of the substring is the same as the last character in the term;
   transmit the vector to a neural network comprising at least two bidirectional gated recurrent neural network (BGRNN) layers, the neural network being configured to receive the vector and generate multiple probabilities based on the vector;

receive from the neural network the multiple probabilities generated based on the transmitted vector;

determine a normalized version of the noncanonical communication using one or more of the multiple probabilities received from the neural network; and determine that the normalized version of the noncanonical communication should be outputted or should not be outputted using at least one of the multiple probabilities received from the neural network.

2. The non-transitory computer readable medium of claim 1, wherein the neural network comprises:

a character projection layer configured to receive the vector, generate an embedding based on the vector, and transmit the embedding;

a first feed forward neural network configured to receive the embedding, apply matrix operations to the embedding to generate a term embedding, and transmit the term embedding;

a BGRNN that includes the at least two BGRNN layers, the BGRNN configured to receive the term embedding, analyze the noncanonical communication in two directions, and transmit a BGRNN output;

a second feed-forward neural network configured to receive the BGRNN output, apply additional matrix operations to the BGRNN output, and transmit a result of the additional matrix operations; and a softmax layer configured to receive the result from the second feed-forward neural network and generate the multiple probabilities based on the result of the additional matrix operations.

3. The non-transitory computer readable medium of claim 2, further comprising program code executable by the processor for causing the processor to preprocess the noncanonical communication by:

replacing each character in the vector with a corresponding index number.

4. The non-transitory computer readable medium of claim 3, wherein the character projection layer is further configured to:

receive the vector;

determine a plurality of floating point vectors associated with a plurality of index numbers from the vector, each floating point vector corresponding to a particular index number from the vector; and concatenate the plurality of floating point vectors together into a single vector, the single vector being the embedding.

5. The non-transitory computer readable medium of claim 2, wherein every respective unit of the first feed-forward neural network only propagates an output value to a subsequent layer of the neural network.

6. The non-transitory computer readable medium of claim 2, wherein one layer of the at least two BGRNN layers is configured to analyze the noncanonical communication in a forward direction and another layer of the at least two BGRNN layers is configured to analyze the noncanonical communication in a backward direction.

7. The non-transitory computer readable medium of claim 2, wherein the at least two BGRNN layers are hidden layers, a hidden layer comprising a layer of units between an input layer and an output layer of the neural network; and wherein the at least two BGRNN layers comprise a plurality of gated recurrent units, each gated recurrent unit of the plurality of gated recurrent units comprising a reset gate and an update gate for controlling an output from the gated recurrent unit.

8. The non-transitory computer readable medium of claim 2, wherein the softmax layer of the neural network is configured to transform the result of the additional matrix operations into a plurality of values that sum to a total value of one, each value of the plurality of values being a number between zero and one and representing a probability of a particular character being in a particular position in the normalized version of the noncanonical communication; and wherein determining the normalized version of the noncanonical communication using one or more of the multiple probabilities generated by the neural network comprises:

determining the normalized version of the noncanonical communication based on the plurality of values.

9. The non-transitory computer readable medium of claim 2, wherein the softmax layer of the neural network is configured to transform the result of the additional matrix operations into a plurality of values that sum to a total value of one, a first value of the plurality of values indicating that the normalized version of the noncanonical communication should be output and a second value of the plurality of values indicating that the normalized version of the noncanonical communication should not be output; and wherein determining that the normalized version of the noncanonical communication should be outputted or should not be outputted using at least one of the multiple probabilities generated by the neural network comprises:

determining that the normalized version of the noncanonical, communication should be outputted in response to the first value being greater than the second value, and that the normalized version of the noncanonical communication should not be outputted in response to the second value being greater than the first value.

10. The non-transitory computer readable medium of claim 1, further comprising program code executable by the processor for causing the processor to:

include the normalized version of the noncanonical communication in a data set for use in textual analysis; and perform textual analysis on the data set to determine one or more trends indicated by the data set.

11. A method comprising:

receiving an electronic representation of a noncanonical communication, the noncanonical communication including multiple terms;

preprocessing the noncanonical communication by:

generating a vector comprising a plurality of characters from a term of the multiple terms, the vector having a predetermined length greater than a length of the term; and repeating a substring of the term in the vector such that a last character of the substring is positioned in a last position in the vector, wherein the last character of the substring is the same as the last character in the term;

transmitting the vector to a neural network comprising at least two bidirectional gated recurrent neural network (BGRNN) layers, the neural network being configured to receive the vector and generate multiple probabilities based on the vector;

receiving from the neural network the multiple probabilities generated based on the transmitted vector;

determining a normalized version of the noncanonical communication using one or more of the multiple probabilities received from the neural network; and determining that the normalized version of the noncanonical communication should be outputted or should not be outputted using at least one of the multiple probabilities received from the neural network.

12. The method of claim 11, wherein the neural network comprises:
a character projection layer that receives the vector; generates an embedding based on the vector, and transmits the embedding;
a first feed-forward neural network that receives the embedding, applies matrix operations to the embedding to generate a term embedding, and transmits the term embedding;
a BGRNN that includes the at least two BGRNN layers, wherein the BGRNN receives the term embedding, analyzes the noncanonical communication in two directions, and transmits a BGRNN output;
a second feed-forward neural network that receives the BGRNN output, applies additional matrix operations to the BGRNN output, and transmits a result of the additional matrix operations; and
a softmax layer that receives the result of the additional matrix operations from the second feed-forward neural network and generates the multiple probabilities based on the result of the additional matrix operations.

13. The method of claim 12, further comprising preprocessing the noncanonical communication by:
replacing each character of the vector with a corresponding index number.

14. The method of claim 12, wherein the character projection layer further:
receives the vector;
determines a plurality of floating point vectors associated with a plurality of index numbers from the vector each floating point vector corresponding to a particular index number from the vector; and
concatenates the plurality of floating point vectors together into a single vector, the single vector being the embedding.

15. The method of claim 12, wherein the first feed-forward neural network is configured such that every unit of the first feed-forward neural network only propagates an output value to a subsequent layer of the neural network.

16. The method of claim 12, wherein one layer of the at least two BGRNN layers operates on the noncanonical communication in a forward direction and another layer of the at least two BGRNN layers operates on the noncanonical communication in a backward direction.

17. The method of claim 12, wherein the at least two BGRNN layers are hidden layers, a hidden layer comprising a layer of units between an input layer and an output layer of the neural network; and
wherein the at least two BGRNN layers comprise a plurality of gated recurrent units, each gated recurrent unit of the plurality of gated recurrent units comprising a reset gate and an update gate for controlling an output from the gated recurrent unit.

18. The method of claim 12, wherein the softmax layer of the neural network transforms the result of the additional matrix operations into a plurality of values that sum to a total value of one, each value of the plurality of values being a number between zero and one and representing a probability of a particular character being in a particular position in the normalized version of the noncanonical communication; and further comprising determining the normalized version of the noncanonical communication using one or more of the multiple probabilities generated by the neural network by:
determining the normalized version of the noncanonical communication based on the plurality of values.

19. The method of claim 12, wherein the softmax layer of the neural network transforms the result of the additional matrix operations into a plurality of values that sum to a total value of one, a first value of the plurality of values indicating that the normalized version of the noncanonical communication should be output and a second value of the plurality of values indicating that the normalized version of the noncanonical communication should not be output, and
further comprising determining that the normalized version of the noncanonical communication should be outputted or should not be outputted using at least one of the multiple probabilities generated by the neural network by:
determining that the normalized version of the noncanonical communication should be outputted in response to first value being greater than the second value, and that the normalized version of the noncanonical communication should not be outputted in response to the second value being greater than the first value.

20. The method of claim 11, further comprising:
including the normalized version of the noncanonical communication in a data set for use in textual analysis; and
performing textual analysis on the data set to determine trends indicated by the data set.

21. A system comprising:
a processing device; and
a memory device in which instructions executable by the processing device are stored for causing the processing device to:
receive an electronic representation of a noncanonical communication, the noncanonical communication including multiple terms;
preprocess the noncanonical communication by:
generating a vector comprising a plurality of characters from a term of the multiple terms, the vector having a predetermined length greater than a length of the term; and
repeating a substring of the term in the vector such that a last character of the substring is positioned in a last position in the vector, wherein the last character of the substring is the same as the last character in the term;
transmit the vector to a neural network comprising at least two bidirectional gated recurrent neural network (BGRNN) layers, the neural network being configured to receive the vector and generate multiple probabilities based on the vector;
receive from the neural network the multiple probabilities generated based on the transmitted vector;
determine a normalized version of the noncanonical communication using one or more of the multiple probabilities received from the neural network; and
determine that the normalized version of the noncanonical communication should be outputted or should not be outputted using at least one of the multiple probabilities received from the neural network.

22. The system of claim 21, wherein the neural network comprises:

a character projection layer configured to receive the vector, generate an embedding based on the vector, and transmit the embedding;

a first feed-forward neural network configured to receive the embedding, apply matrix operations to the embedding to generate a term embedding, and transmit the term embedding;

a BGRNN that includes the at least two BGRNN layers, the BGRNN configured to receive the term embedding, analyze the noncanonical communication in two direction, and transmit a BGRNN output;

a second feed-forward neural network configured to receive the BGRNN output, apply additional matrix operations to the BGRNN output, and transmit a result of the additional matrix operations; and a softmax layer configured to receive the result from the second feed-forward neural network and generate the multiple probabilities based on the result of the additional matrix operations.

23. The system of claim 22, wherein the memory device further comprises instructions executable by the processing device for causing the processing device to preprocess the noncanonical communication by:

replacing each character in the vector with a corresponding index number.

24. The system of claim 23, wherein the character projection layer is further configured to:

receive the vector;

determine a plurality of floating point vectors associated with a plurality of index numbers from the vector, each loafing point vector corresponding to a particular index number from the vector; and concatenate the plurality of floating point vectors together into a single vector, the single vector being the embedding.

25. The system of claim 22, wherein the first feed-forward neural network is configured such that every unit of the first feed-forward neural network only propagates an output value to a subsequent layer of the neural network.

26. The system of claim 22, wherein one layer of the at least two BGRNN layers is configured to analyze the noncanonical communication in a forward direction and another layer of the at least two BGRNN layers is configured to analyze the noncanonical communication in a backward direction.

27. The system of claim 22, wherein the at least two BGRNN layers are hidden layers, a hidden layer comprising a layer of units between an input layer and an output layer of the neural network; and wherein the at least two BGRNN layers comprise a plurality of gated recurrent units, each gated recurrent unit of the plurality of gated recurrent units comprising a reset gate and an update gate for controlling an output from the gated recurrent unit.

28. The system of claim 22, wherein the softmax layer of the neural network is configured to transform the result of the additional matrix operations into a plurality of values that sum to a total value of one, each value of the plurality of values being a number between zero and one and representing a probability or a particular character being in a particular position in the normalized version of the noncanonical communication; and wherein determining the normalized version of the noncanonical communication using one or more of the multiple probabilities generated by the neural network comprises:

determining the normalized version of the noncanonical communication based on the plurality of values.

29. The system of claim 22, wherein the softmax layer of the neural network is configured to transform the result of the additional matrix operations into a plurality of values that sum to a total value of one, a first value of the plurality of values indicating that the normalized version of the noncanonical communication should be output and a second value of the plurality of values indicating that the normalized version of the noncanonical communication should not be output; and wherein determining that the normalized version of the noncanonical communication should be outputted or should not be outputted using at least one of the multiple probabilities generated by the neural network comprises:

determining that the normalized version of the noncanonical communication should be outputted in response to the first value being greater than the second value, and that the normalized version of the noncanonical communication should not be outputted in response to the second value being greater than the first value.

30. The system of claim 21, wherein the memory device further comprises instructions executable by the processing device for the processing device to:

include the normalized version of the noncanonical communication in a data set for use in textual analysis; and perform textual analysis on the data set to determine one or more trends indicated by the data set.

* * * * *